United States Patent
Sasaki et al.

(10) Patent No.: US 12,491,242 B2
(45) Date of Patent: Dec. 9, 2025

(54) RECOMBINANT VIRUSES AND THE USES THEREOF

(71) Applicant: Ceva Sante Animale, Libourne (FR)

(72) Inventors: Kenta Sasaki, Yokohama (JP); Jina Lee, Yokohama (JP)

(73) Assignee: CEVA SANTE ANIMALE S.A., Libourne (FR)

( * ) Notice: Subject to any disclaimer, the term of this patent is extended or adjusted under 35 U.S.C. 154(b) by 1037 days.

(21) Appl. No.: 17/417,455

(22) PCT Filed: Dec. 26, 2019

(86) PCT No.: PCT/EP2019/087042
§ 371 (c)(1),
(2) Date: Jun. 23, 2021

(87) PCT Pub. No.: WO2020/136220
PCT Pub. Date: Jul. 2, 2020

(65) Prior Publication Data
US 2022/0062411 A1    Mar. 3, 2022

(30) Foreign Application Priority Data

Dec. 27, 2018 (EP) .................................... 18306852

(51) Int. Cl.
*A61K 39/255* (2006.01)
*C12N 15/113* (2010.01)
*C12N 15/86* (2006.01)
*A61K 39/00* (2006.01)

(52) U.S. Cl.
CPC ........ *A61K 39/255* (2013.01); *C12N 15/1131* (2013.01); *C12N 15/86* (2013.01); *A61K 2039/5254* (2013.01); *A61K 2039/5256* (2013.01); *A61K 2039/552* (2013.01); *C12N 2710/16334* (2013.01)

(58) Field of Classification Search
None
See application file for complete search history.

(56) References Cited

U.S. PATENT DOCUMENTS

2016/0220657 A1\* 8/2016 Esaki .................... A61K 39/17

FOREIGN PATENT DOCUMENTS

WO    WO 2016/120421    8/2016

OTHER PUBLICATIONS

Parcells, et al. (J Virol. Dec. 1994;68(12):8239-53. doi: 10.1128/JVI.68.12.8239-8253.1994. PMID: 7966617 . . . (Year: 1994).\*
Written Opinion in International Application No. PCT/EP2019/087042, Feb. 19, 2020, pp. 1-5.

\* cited by examiner

*Primary Examiner* — Janet L Andres
*Assistant Examiner* — Jeffrey Mark Sifford
(74) *Attorney, Agent, or Firm* — SALIWANCHIK, LLOYD & EISENSCHENK

(57) ABSTRACT

The present invention relates recombinant viruses and the uses thereof. More particularly, the invention relates to novel recombinant Marek's disease viruses encoding polypeptide (s) of interest, and their use to express or deliver such polypeptides to animals, particularly poultry. The invention is particularly suited to vaccinate poultry against avian pathogens.

25 Claims, 9 Drawing Sheets
Specification includes a Sequence Listing.

SEQUENCE LISTING

```
<160> NUMBER OF SEQ ID NOS: 24

<210> SEQ ID NO 1
<211> LENGTH: 30
<212> TYPE: DNA
<213> ORGANISM: Artificial Sequence
<220> FEATURE:
<223> OTHER INFORMATION: oligonucleotide

<400> SEQUENCE: 1
ctaggaggta ccaagtctca gacaaaccgc                                        30

<210> SEQ ID NO 2
<211> LENGTH: 43
<212> TYPE: DNA
<213> ORGANISM: Artificial Sequence
<220> FEATURE:
<223> OTHER INFORMATION: oligonucleotide
```

<400> SEQUENCE: 2
ggagaatatt ctgtaggcct tattggccgg accggcagaa ctt                        43

<210> SEQ ID NO 3
<211> LENGTH: 43
<212> TYPE: DNA
<213> ORGANISM: Artificial Sequence
<220> FEATURE:
<223> OTHER INFORMATION: oligonucleotide

<400> SEQUENCE: 3
aagttctgcc ggtccggcca ataaggccta cagaatattc tcc                        43

<210> SEQ ID NO 4
<211> LENGTH: 30
<212> TYPE: DNA
<213> ORGANISM: Artificial Sequence
<220> FEATURE:
<223> OTHER INFORMATION: oligonucleotide

<400> SEQUENCE: 4
cctgttgagc tccggaattt tcggaccaat                                       30

<210> SEQ ID NO 5
<211> LENGTH: 30
<212> TYPE: DNA
<213> ORGANISM: Artificial Sequence
<220> FEATURE:
<223> OTHER INFORMATION: oligonucleotide

<400> SEQUENCE: 5
gccggcggta ccgagttctc ttttttttta                                       30

<210> SEQ ID NO 6
<211> LENGTH: 43
<212> TYPE: DNA
<213> ORGANISM: Artificial Sequence
<220> FEATURE:
<223> OTHER INFORMATION: oligonucleotide

<400> SEQUENCE: 6
gtttgacaaa acctgggcct tattggcccc tcgcatatgg ggg                        43

<210> SEQ ID NO 7
<211> LENGTH: 43
<212> TYPE: DNA
<213> ORGANISM: Artificial Sequence
<220> FEATURE:
<223> OTHER INFORMATION: oligonucleotide

<400> SEQUENCE: 7
cccccatatg cgaggggcca ataaggccca ggttttgtca aac                        43

<210> SEQ ID NO 8
<211> LENGTH: 30
<212> TYPE: DNA
<213> ORGANISM: Artificial Sequence
<220> FEATURE:
<223> OTHER INFORMATION: oligonucleotide

<400> SEQUENCE: 8
ctggatgagc tcgacatggc acatcgtcta                                       30

<210> SEQ ID NO 9
<211> LENGTH: 49

```
<212> TYPE: DNA
<213> ORGANISM: Artificial Sequence
<220> FEATURE:
<223> OTHER INFORMATION: oligonucleotide

<400> SEQUENCE: 9
atgttgcgac atatgcatgg ccttattggc ccctcgcata tgggggtgg          49

<210> SEQ ID NO 10
<211> LENGTH: 49
<212> TYPE: DNA
<213> ORGANISM: Artificial Sequence
<220> FEATURE:
<223> OTHER INFORMATION: oligonucleotide

<400> SEQUENCE: 10 ccaccccat atgcgagggg ccaataaggc catgcatatg tcgcaacat           49

<210> SEQ ID NO 11
<211> LENGTH: 37
<212> TYPE: DNA
<213> ORGANISM: Artificial Sequence
<220> FEATURE:
<223> OTHER INFORMATION: oligonucleotide

<400> SEQUENCE: 11
aactgaggcc ttattggcct gcagtatttt gtgcagc                      37

<210> SEQ ID NO 12
<211> LENGTH: 37
<212> TYPE: DNA
<213> ORGANISM: Artificial Sequence
<220> FEATURE:
<223> OTHER INFORMATION: oligonucleotide

<400> SEQUENCE: 12
gccctgggcc aataaggcct aagatacatt gatgagt                      37

<210> SEQ ID NO 13
<211> LENGTH: 20
<212> TYPE: DNA
<213> ORGANISM: Artificial Sequence
<220> FEATURE:
<223> OTHER INFORMATION: oligonucleotide

<400> SEQUENCE: 13
agctaaccac agcgtgtctc                                         20

<210> SEQ ID NO 14
<211> LENGTH: 20
<212> TYPE: DNA
<213> ORGANISM: Artificial Sequence
<220> FEATURE:
<223> OTHER INFORMATION: oligonucleotide

<400> SEQUENCE: 14
aaagcattct cggtcccctg                                         20

<210> SEQ ID NO 15
<211> LENGTH: 24
<212> TYPE: DNA
<213> ORGANISM: Artificial Sequence
<220> FEATURE:
<223> OTHER INFORMATION: oligonucleotide

<400> SEQUENCE: 15
```
tgaactacac aaaattgata ctga      24

<210> SEQ ID NO 16
<211> LENGTH: 23
<212> TYPE: DNA
<213> ORGANISM: Artificial Sequence
<220> FEATURE:
<223> OTHER INFORMATION: oligonucleotide

<400> SEQUENCE: 16
cggtccggtt gttggcatca gaa      23

<210> SEQ ID NO 17
<211> LENGTH: 27
<212> TYPE: DNA
<213> ORGANISM: Artificial Sequence
<220> FEATURE:
<223> OTHER INFORMATION: oligonucleotide

<400> SEQUENCE: 17
ggggtcgact catctgtaga cactgtg      27

<210> SEQ ID NO 18
<211> LENGTH: 27
<212> TYPE: DNA
<213> ORGANISM: Artificial Sequence
<220> FEATURE:
<223> OTHER INFORMATION: oligonucleotide

<400> SEQUENCE: 18
ggggaattcg actgtgttgt ggaatat      27

<210> SEQ ID NO 19
<211> LENGTH: 1367
<212> TYPE: DNA
<213> ORGANISM: Artificial Sequence
<220> FEATURE:
<223> OTHER INFORMATION: vp2

<400> SEQUENCE: 19
atgacaaacc tgcaagatca aacccaacag attgttccgt tcatacggag ccttctgatg      60
ccaacaaccg gaccggcgtc cattccggac gacaccctgg agaagcacac tctcaggtca     120
gagacctcga cctacaattt gactgtgggg gacacagggt cagggctaat tgtctttttc     180
cctggattcc ctggctcaat tgtgggtgct cactacacac tgcagagcaa tgggaactac     240
aagttcgatc agatgctcct gactgcccag aacctaccgg ccagttacaa ctactgcagg     300
ctagtgagtc ggagtctcac agtgaggtca agcacactcc ctggtggcgt ttatgcacta     360
aacggcaccg taaacgccgt gaccttccaa ggaagcctga gtgaactgac agatgttagc     420
tacaatgggt tgatgtctgc aacggccaac atcaacgaca aaattgggaa tgtcctagta     480
ggggaagggg tcaccgtcct cagcttaccc acatcatatg atcttgggta tgtgaggctt     540
ggtgacccca ttcctgctat agggcttgac ccaaaaatgg tagccacatg tgacagcagt     600
gacaggccca gagtctacac cataactgca gccgatgatt accaattctc atcacagtac     660
caaccaggtg gggtaacaat cacactgttc tcagccaaca ttgatgctat acaagcctc     720
agcattgggg gagagctcgt gttccaaaca agcgtccaag gccttgtact gggcgctacc     780
atctacctta taggctttga tgggactaca gtaatcacca gagctgtggc ctcagacaat     840
gggctgactg ccggcaccga caatcttatg ccattcaatc ttgtgattcc gaccaacgag     900
ataacccagc caatcacatc catcaaactg gagatagtga cctccaaaag tggcggtcag     960

```
gcaggggacc agatgtcatg gtcggcaagt gggagcctag cagtgacaat ccatggtggc    1020
aactatccag gggccctccg tcccgtcaca ctagtagcct acgaaagagt ggcaacagga    1080
tccgtcgtta cggtagccgg ggtgagcaac ttcgagctga tcccaaatcc tgaactagca    1140
aagaacctgg ttacagaata cggccgattt gacccaggag ccatgaacta cacaaaattg    1200
atactgagtg agagggaccg tcttggcatc aagaccgtct ggccaacaag ggagtacact    1260
gactttcgtg agtacttcat ggaggtggcc gacctcaact ctcccctgaa gattgcagga    1320
gcatttggct tcaaagacat aatccgggcc ataaggaggt gagtcga                  1367

<210> SEQ ID NO 20
<211> LENGTH: 274
<212> TYPE: DNA
<213> ORGANISM: Artificial Sequence
<220> FEATURE:
<223> OTHER INFORMATION: coa5 promoter

<400> SEQUENCE: 20
tattttgtgc agcgatgggg gcgggggggg ggggggcgcg cgccaggcgg ggcggggcgg     60
ggcgaggggc ggggcggggc gaggcggaga ggtgcggcgg cagccaatca gagcggcgcg    120
ctccgaaagt ttccttttat ggcgaggcgg cggcggcggc ggccctataa aaagcgaagc    180
gcgcggcggg cgggagtcgc tgcgcgctgc cttcgccccg tgcccgctc cgccgccgcc     240 tcgcgccgcc cgccccggct ctgactgacc gcgt                                274

<210> SEQ ID NO 21
<211> LENGTH: 302
<212> TYPE: DNA
<213> ORGANISM: Artificial Sequence
<220> FEATURE:
<223> OTHER INFORMATION: sv40 polyA

<400> SEQUENCE: 21
ctaattgttt gtgtattttta gattcacagt cccaaggctc atttcaggcc cctcagtcct     60
cacagtctgt tcatgatcat aatcagccat accacatttg tagaggtttt acttgcttta    120
aaaaacctcc cacacctccc cctgaacctg aaacataaaa tgaatgcaat tgttgttgtt    180
aacttgttta ttgcagctta taatggttac aaataaagca atagcatcac aaatttcaca    240
aataaagcat ttttttcact gcattctagt tgtggtttgt ccaaactcat caatgtatct    300
ta                                                                   302

<210> SEQ ID NO 22
<211> LENGTH: 1506
<212> TYPE: DNA
<213> ORGANISM: Artificial Sequence
<220> FEATURE:
<223> OTHER INFORMATION: bac promoter

<400> SEQUENCE: 22
tgcagctcag tgcatgcacg ctcattgccc atcgctatcc ctgcctctcc tgctggcgct     60
ccccgggagg tgacttcaag gggaccgcag gaccacctcg ggggtggggg gagggctgca    120
cacgcggacc ccgctccccc tcccaacaa agcactgtgg aatcaaaaag ggggaggggg    180
ggatggaggg gcgcgtcaca ccccgcccc acaccctcac ctcgaggtga gccccacgtt    240
ctgcttcact ctccccatct cccccccctc cccaccccca attttgtatt tatttatttt    300
ttaattattt tgtgcagcga tgggggcggg ggggggggg gcgcgcgcca ggcggggcgg    360
```

| | | |
|---|---|---|
| ggcggggcca gggcggggc ggggcgaggc ggagaggtgc ggcggcagcc aatcagagcg | 420 | |
| gcgcgctccg aaagtttcct tttatggcga ggcggcggcg gcggcggccc tataaaaagc | 480 | |
| gaagcgcgcg gcgggcggga gtcgctgcgc gctgccttcg ccccgtgccc cgctccgccg | 540 | |
| ccgcctcgcg ccgcccgccc cggctctgac tgaccgcgtt actcccacag gtgagcgggc | 600 | |
| gggacggccc ttctcctccg ggctgtaatt agcgcttggt ttaatgacgg ctcgtttctt | 660 | |
| ttctgtggct gcgtgaaagc cttaaagggc tccgggaggg cccttttgtgc ggggggagc | 720 | |
| ggctcggggg gtgcgtgcgt gtgtgtgtgc gtggggagcg ccgcgtgcgg ctccgcgctg | 780 | |
| cccggcggct gtgagcgctg cgggcgcggc gcggggcttt gtgcgctccg cagtgtgcgc | 840 | |
| gaggggagcg cggccggggg cggtgccccg cggtgcgggg ggggctgcga ggggaacaaa | 900 | |
| ggctgcgtgc ggggtgtgtg cgtgggggg tgagcagggg gtgtgggcgc ggcggtcggg | 960 | |
| ctgtaacccc cccctgcacc cccctccccg aagttgctga gcacggcccg gcttcgggtg | 1020 | |
| cggggctccg tgcggggcgt ggcgcggggc tcgccgtgcc gggcggggg tggcggcagg | 1080 | |
| tgggggtgcc gggcgggcg gggccgcctc gggccgggga gggctcgggg gaggggcgcg | 1140 | |
| gcggcccccg gagcgccggc ggctgtcgag gcgcggcgag ccgcagccat tgccttttat | 1200 | |
| ggtaatcgtg cgagagggcg cagggacttc ctttgtccca aatctgtgcg gagccgaaat | 1260 | |
| ctggaggcg ccgccgcacc ccctctagcg ggcgcggggc gaagcggtgc ggcgccggca | 1320 | |
| ggaaggaaat gggcggggag ggccttcgtg cgtcgccgcg ccgccgtccc cttctccatc | 1380 | |
| tccagcctcg gggctgtccg cagggggacg gctgccttcg ggggggacgg ggcagggcgg | 1440 | |
| ggttcggctt ctggcgtgtg accggcgggg tttatatctt cccttctctg ttcctccgca | 1500 | |
| gccccc | 1506 | |

<210> SEQ ID NO 23
<211> LENGTH: 1410
<212> TYPE: DNA
<213> ORGANISM: Artificial Sequence
<220> FEATURE:
<223> OTHER INFORMATION: gbdel

<400> SEQUENCE: 23

| | | |
|---|---|---|
| atggctagct tgaaaatgct gatctgcgtg tgcgtggcaa tcctgatccc atctacccta | 60 | |
| tctcaagatt cacacggaat tgccggaata atagaccctc gtgatacagc cagcatggat | 120 | |
| gttggaaaaa tctcttctc cgaagccatt gggtcggggg caccgaaaga accccagatt | 180 | |
| agaaacagaa tttttgcgtg ctcatctcca actggcgcca gtgttgcgag gcttgcccag | 240 | |
| ccacgacatt gtcaccgaca tgccgattcg actaacatga ctgaaggaat tgccgtagtc | 300 | |
| ttcaagcaaa acattgcccc gtacgtcttt aatgtgactc tatactataa acatataacc | 360 | |
| acagttacta cgtgggcatt attctcaaga ccccaaataa caaatgagta cgtgaccagg | 420 | |
| gttccaatag actatcatga aattgtcagg attgatcgat cgggagaatg ctcatccaaa | 480 | |
| gcaacgtatc ataaaaattt catgttttt gaagcttacg acaatgatga acgagaaaaa | 540 | |
| aaattgcccc tggttccatc actgttaaga tcaactgtct ccaaggcgtt tcatacaact | 600 | |
| aactttacta agcgacatca aaccctggga taccgaacgt ctacatcggt cgactgtgtt | 660 | |
| gtggaatatc tacaggctag atctgtatac ccgtatgatt actttggaat ggcgacaggt | 720 | |
| gatacagtag aaatttctcc ctttatacc aaaaacacga ccggaccaag gcgtcacagt | 780 | |
| gtctacagag actatagatt tctcgaaatc gcaaattatc aagtcaggga tttgaaaacc | 840 | |
| ggacaaataa gaccccctaa aaaagaaac tttctaacag atgaacaatt cactataggc | 900 | |

```
tgggatgcaa tggaagaaaa ggaatctgta tgtactctca gtaaatggat tgaagtcccg    960
gaagcagttc gtgtttcgta caaaaacagt taccactttt cacttaaaga tatgactatg   1020
acgttctcgt ccggaaaaca acctttaac atcagcaggc ttcatttggc tgaatgcgtt   1080
cctaccatag cttcggaggc catagatggc atctttgcca gaaagtatag ttcgactcat   1140
gtccgttctg gggacatcga atactatctc ggtagtggcg gatttctgat cgcatttcag   1200
aaactcatga gccatggctt ggctgaaatg tacctagaag aggcacaaag acaaaatcat   1260
ctcccgagag ggagagagcg tcgccaaggc gacctctaca aatgtggtat ggctgattat   1320
gatcatgaac agactgtgag gactgagggg cctgaaatga gccttgggac tgtgaatcga   1380
cctattagac ctatttactc atcgcattag                                    1410

<210> SEQ ID NO 24
<211> LENGTH: 525
<212> TYPE: DNA
<213> ORGANISM: Artificial Sequence
<220> FEATURE:
<223> OTHER INFORMATION: rsv promoter

<400> SEQUENCE: 24
atctgctccc tgcttgtgtg ttggaggtcg ctgagtagtg cgcgagcaaa atttaagcta     60
caacaaggca aggcttgacc gacaattgca tgaagaatct gcttagggtt aggcgttttg    120
cgctgcttcg cgatgtacgg gccagatata cgcgtatctg aggggactag ggtgtgttta    180
ggcgaaaagc ggggcttcgg ttgtacgcgg ttaggagtcc cctcaggata tagtagtttc    240
gcttttgcat agggagggg aaatgtagtc ttatgcaata ctcttgtagt cttgcaacat    300
ggtaacgatg agttagcaac atgccttaca aggagagaaa aagcaccgtg catgccgatt    360
ggtggaagta aggtggtacg atcgtgcctt attaggaagg caacagacgg gtctgacatg    420
gattggacga accactgaat accgcattgc agagataatt gtatttaagt gcctagctcg    480
atacaataaa cgccatttga ccattcacca cattggtgtg cacct                   525
```

RECOMBINANT VIRUSES AND THE USES THEREOF

FIELD OF THE INVENTION

The present invention relates to recombinant viruses and the uses thereof. More particularly, the invention relates to novel recombinant Marek's Disease Viruses encoding molecule(s) of interest, and their use to express or deliver such molecules to animals, particularly poultry. The invention is particularly suited to vaccinate poultry against avian pathogens.

BACKGROUND OF THE INVENTION

Poultry meat and eggs are important food sources, whose consumption increases continually due to the growth of the human population and their great quality-price ratio. The recent epidemic of avian influenza focused the public opinion on poultry health as well as food safety and security. Poultry vaccine technology became a worldwide concern.

Recombinant viruses expressing pathogen proteins are commonly used as poultry vaccines against targeted pathogens. Vaccines including such viruses induce expression of foreign pathogen proteins or fragments thereof within infected cells, which can subsequently induce a specific and protective humoral immunity as well as cell-mediated immunity.

It is known that different viruses can survive in the body of an infected animal in the state of latent or persistent infection. Consequently, such viruses, in which a foreign gene derived from a pathogen has been integrated, have been developed to be used as viral-vectored vaccines increasing the duration of immunity to an immunized animal.

These viral vectors (or recombinant viruses) are based typically on avipox viruses, such as fowlpox (EP-A-0,517, 292), herpes virus, such as Marek's disease virus serotypes 1, 2 and 3 (Herpes Virus of Turkey (HVT)) (e.g., WO-A-87/04463, U.S. Pat. Nos. 5,980,906, 5,853,733) or, alternatively, Newcastle disease virus (NDV) and avian adenoviruses.

These recombinant avian viruses display variable levels of protection. A recombinant HVT expressing a VP2 protein of Infectious Bursal Disease (IBD) virus has shown advantages over classical IBD vaccines (Vectormune® IBD). Other HVT vectors of interest express antigens of Newcastle Disease (ND) virus (Vectormune® ND) or of Infectious Laryngotracheitis (ILT) virus (Vectormune® LT).

One of the practical problems of HVT-based recombinant viruses can be their interference when they are used in combination to confer immunogenicity against distinct pathogens. Indeed, when two distinct rHVT expressing different antigens are mixed, a lower protection can be induced at least against one of the diseases (see e.g., Slacum G et al., 2009, The compatibility of HVT recombinants with other Marek's disease vaccines, 58th Western Poultry Disease Conference, Sacramento, CA, USA, March 23-25, p 84).

Accordingly, there is a need for new approaches to improve vaccination in animals, particularly in poultry, allowing concomitant protection against several diseases.

Multivalent HVT vectors have been developed which can express two distinct antigenic peptides (see WO2013/144355).

Recombinant vectors based on MDV1 have also been reported e.g., in WO2016/120421, using cloning regions located mainly in UL. Cloning sites in US have also been mentioned, such as US2 or US10 for instance.

The present invention discloses novel recombinant viruses suitable to induce strong immune protection in animals and which may, in addition, be used in combination with other viral vaccines, such as recombinant HVT vaccines, to procure extended immunity.

SUMMARY OF THE INVENTION

The present invention discloses novel recombinant viruses suitable to induce strong immune protection in animals and which may, in addition, be used in combination with other viral vaccines, such as recombinant HVT vaccines, to elicit extended immunity. The present invention more specifically relates to novel recombinant Marek's Disease Viruses of serotype 1 ("rMDV1") containing one or more foreign genes located in the MDV086.6 locus. The invention indeed shows said locus within the MDV1 genome allows effective cloning and stable expression of foreign genes.

An object of the invention therefore resides in a recombinant Marek's Disease Virus of serotype 1 (rMDV1) comprising a recombinant nucleic acid in its genome, wherein said recombinant nucleic acid is located in the MDV086.6 (SORF1) locus of the genome.

As will be further disclosed in the invention, the recombinant nucleic acid may be cloned in replacement of all or part of MDV086.6 (SORF1) locus, by insertion within MDV086.6 (SORF1) coding sequence, or by insertion in an intergenic region flanking MDV086.6 (SORF1).

A further object of the invention relates to a nucleic acid molecule comprising the genome of a rMDV1 as defined above.

The invention also relates to a vector (e.g., a plasmid, cosmid, virus, chromosome, etc.) comprising a nucleic acid molecule as defined above.

The invention also concerns a host cell, or culture of such cells, comprising a rMDV1, a vector or a nucleic acid as defined above.

A further object of the invention is a method for producing or replicating a rMDV1 as defined above, comprising infecting a competent cell with a nucleic acid molecule as defined above or a rMDV1 as defined above, and collecting the rMDV1.

A further object of the invention is a method for producing a rMDV1 comprising (i) the introduction of a recombinant nucleic acid under the control of a promoter into the MDV086.6 locus of a Marek's disease virus of serotype 1, (ii) replicating the virus and, (iii) collecting the virus.

Another object of the invention is a composition, such as a vaccine, comprising a rMDV1 as defined above, and a pharmaceutically or veterinary acceptable excipient and/or adjuvant.

Such a composition can be used e.g., for vaccinating or immunizing avians, such as poultry.

Another object of the invention thus resides in a rMDV1 as defined above or a composition as defined above for use for vaccinating an avian, preferably a chicken, against a pathogen.

Another object of the invention resides in a rMDV1 or composition as defined above for use to induce or stimulate an immune response in an avian, preferably a chicken.

A further object of the invention is a rMDV1 as defined above, for use in combination with a further recombinant herpes virus of a distinct serotype and expressing a distinct antigen, for vaccinating an avian against at least two distinct pathogens, preferably a chicken, by simultaneous, separate, sequential or alternated administration.

In another aspect, the invention provides a method of vaccinating or immunizing an animal comprising at least one administration of a rMDV1 or composition as defined above.

In a further aspect, the invention provides a method for inducing an immunogenic or protective response in an animal against one or more avian pathogens comprising at least one administration of a rMDV1 or composition as defined above.

The invention further relates to a method of immunizing an avian comprising administering to said avian an effective immunizing amount of a rMDV1 or composition of the invention.

The invention further provides a vaccination kit for immunizing an avian which comprises an effective amount of a composition of the invention and a means for administering said composition to said avian.

The invention may be used for expressing any polypeptide, preferably for expressing antigens of avian pathogens. It is suitable for vaccinating avians such as poultry.

LEGEND TO THE FIGURES

Figure 3:
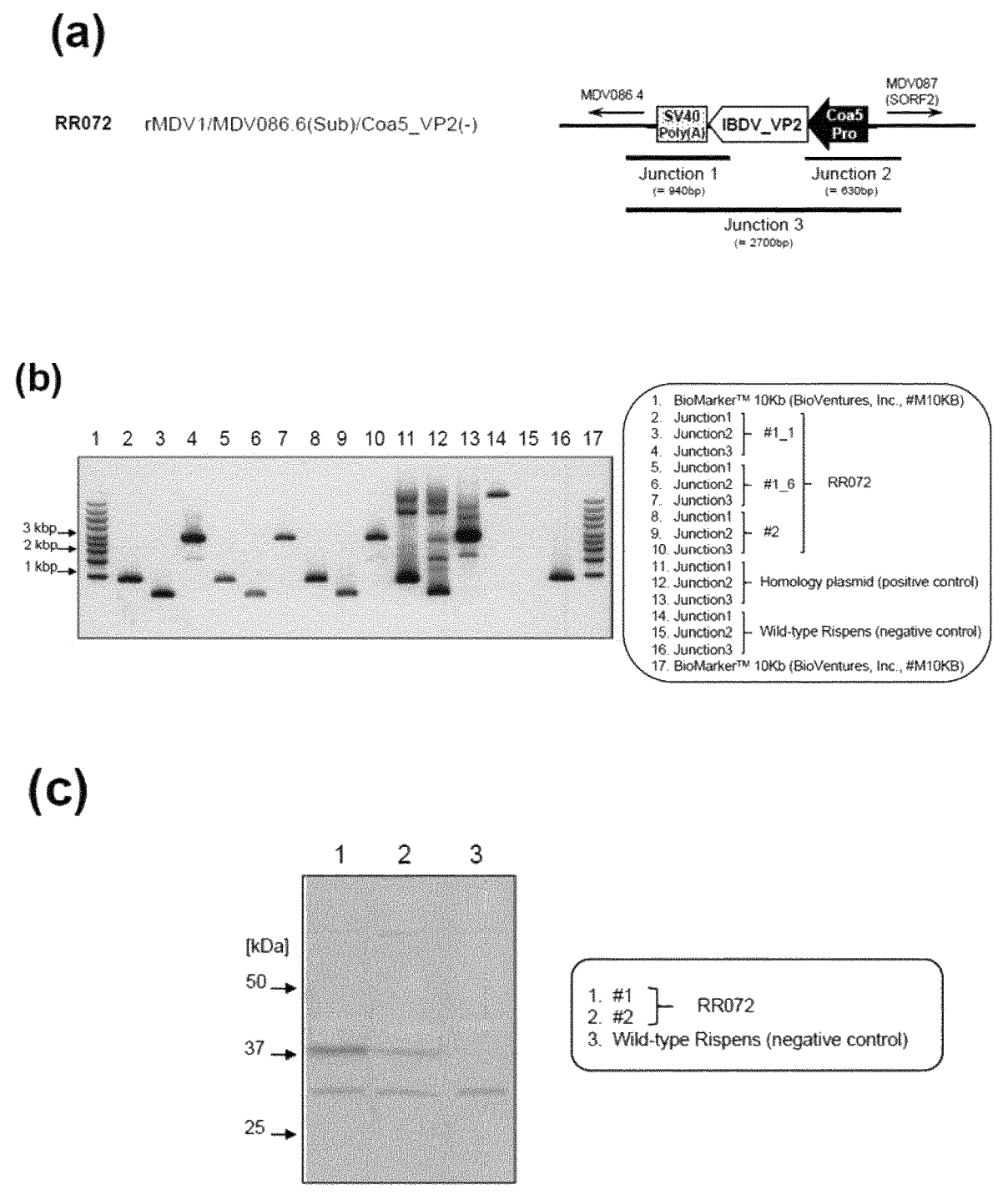

FIG. 3(a) shows a diagram of recombinant MDV1/IBD (RR072) genome, indicating locations of all junctions amplified in PCR reactions to confirm the genome structures of the virus. FIG. 3(b) shows the results of PCR analyses. RR072 was harvested at PASS+1 and prepared for the PCR analyses. FIG. 3(c) illustrates western blot assay detecting expression of IBDV VP2 protein by the recombinant MDV1/IBD, RR072 (PASS+1). Molecular weight of VP2 protein is approximately 40 kDa.

Figure 4:
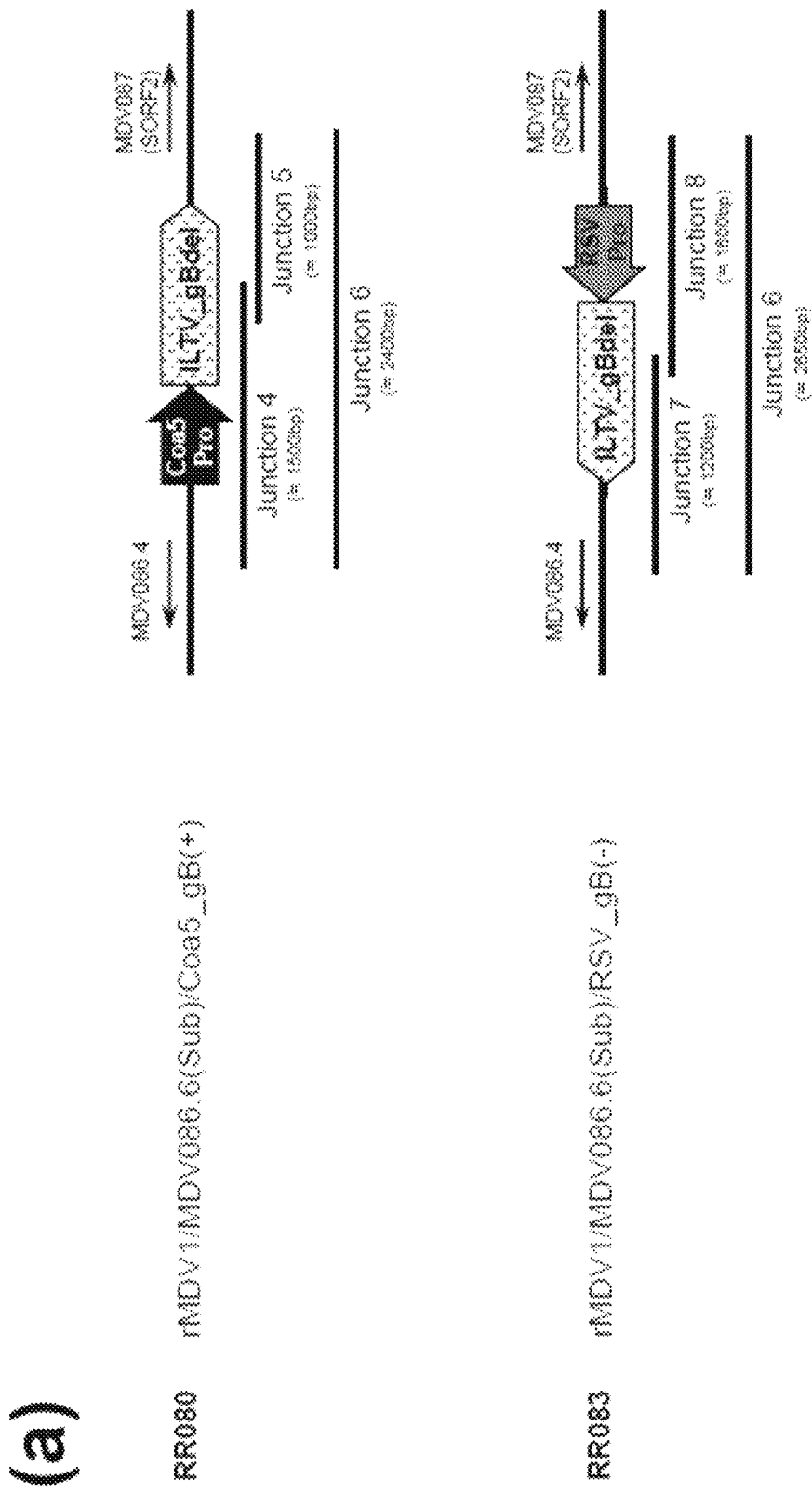
Figure 4:
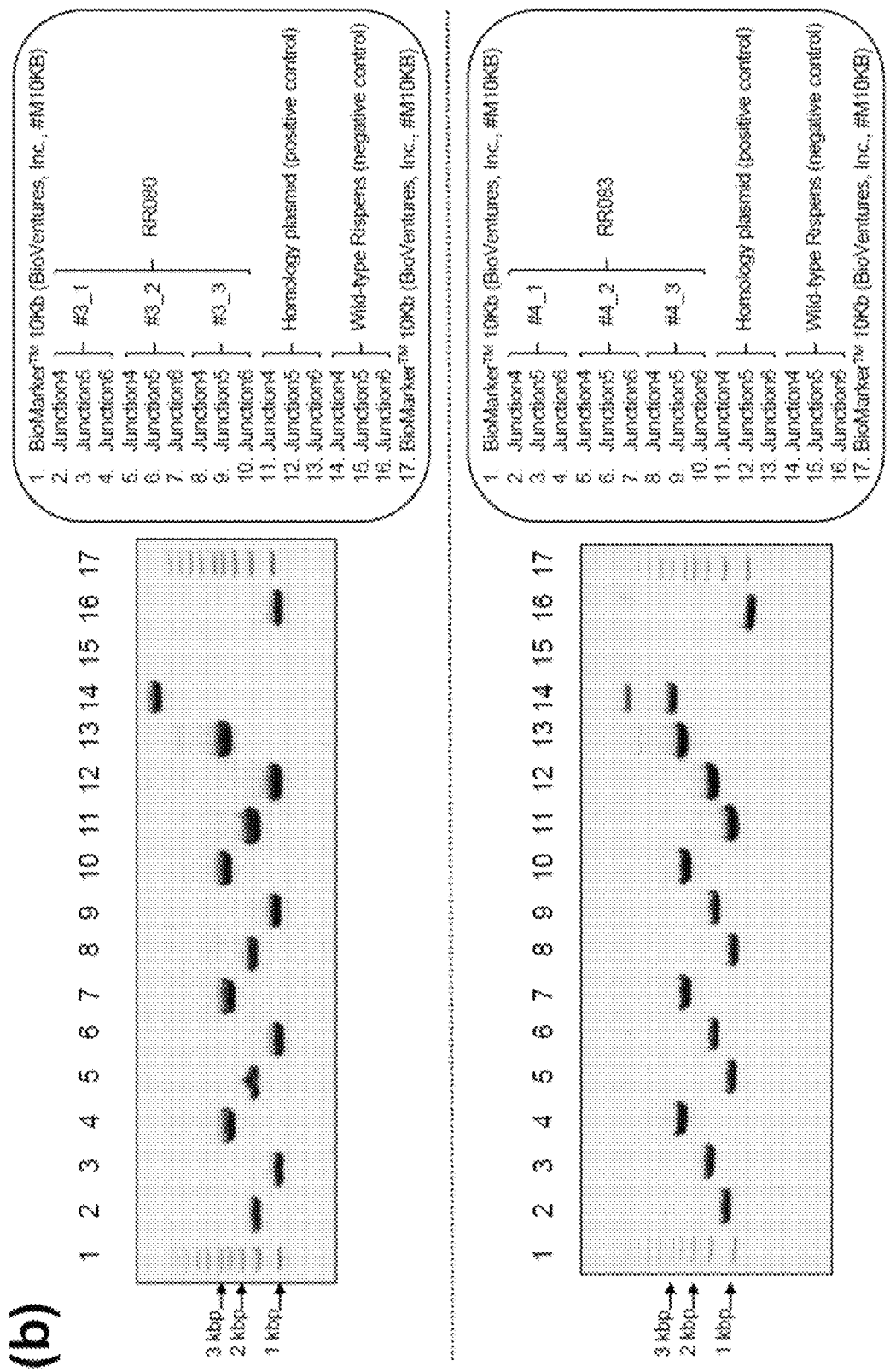
Figure 4:
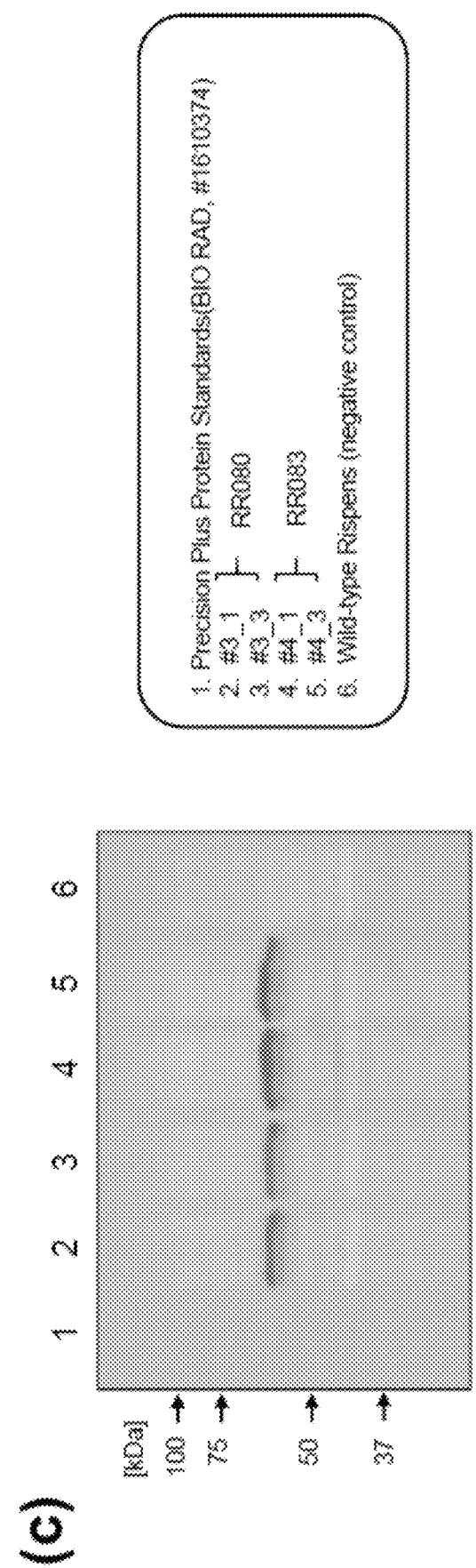

FIG. 4(a) shows diagrams of recombinant MDV1/ILT (RR080 and RR083) genome, indicating locations of all junctions amplified in PCR reactions to confirm the genome structures of the viruses. FIG. 4(b) shows the results of PCR analyses. All recombinant MDV1/ILTs were harvested at PASS+5. FIG. 4(c) shows a western blot assay detecting expression of ILTV gB protein by the recombinant MDV1/ILT viruses, RR080 or RR083 (PASS+1). Molecular weight of ILTV gB protein which is expressed from recombinant MDV1/ILT is estimated to be about 53 kDa.

Figure 5:
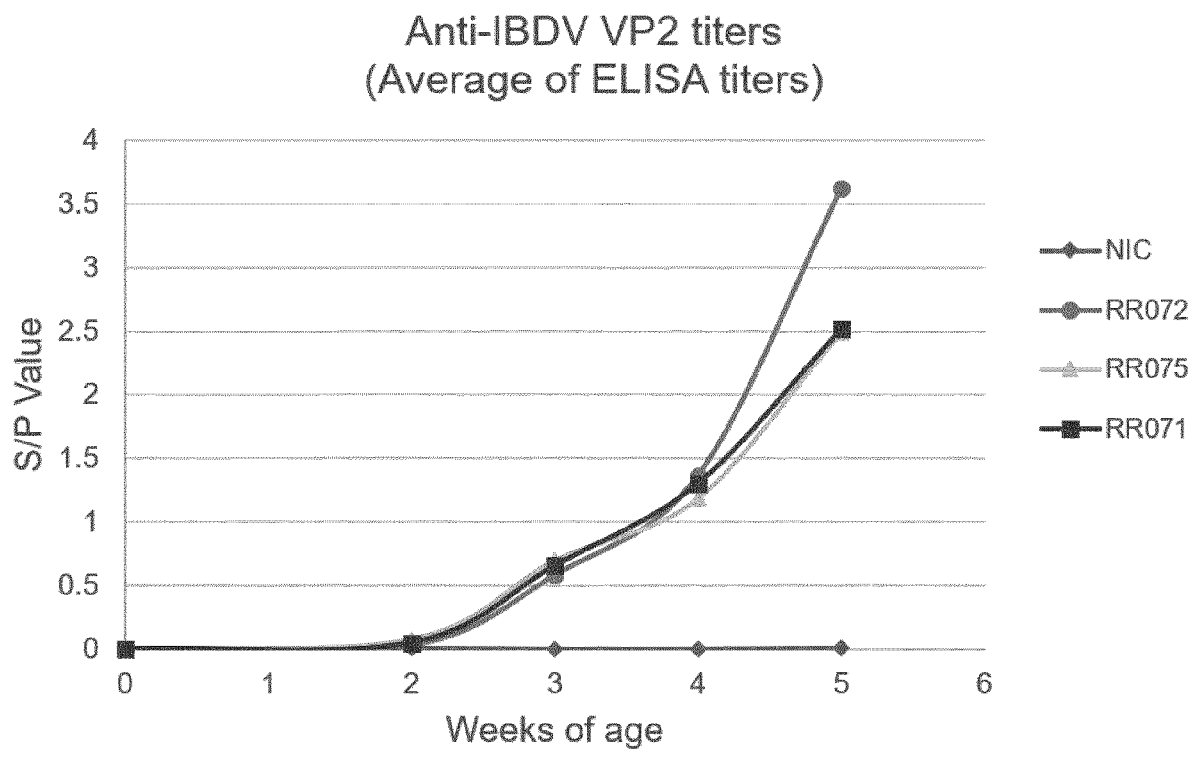

FIG. 5 illustrates the average of IBDV ELISA titers in SPF chickens vaccinated with recombinant MDV1/IBD (RR071 or RR072 or RR075) using a commercial IBD ELISA kit.

Figure 6:
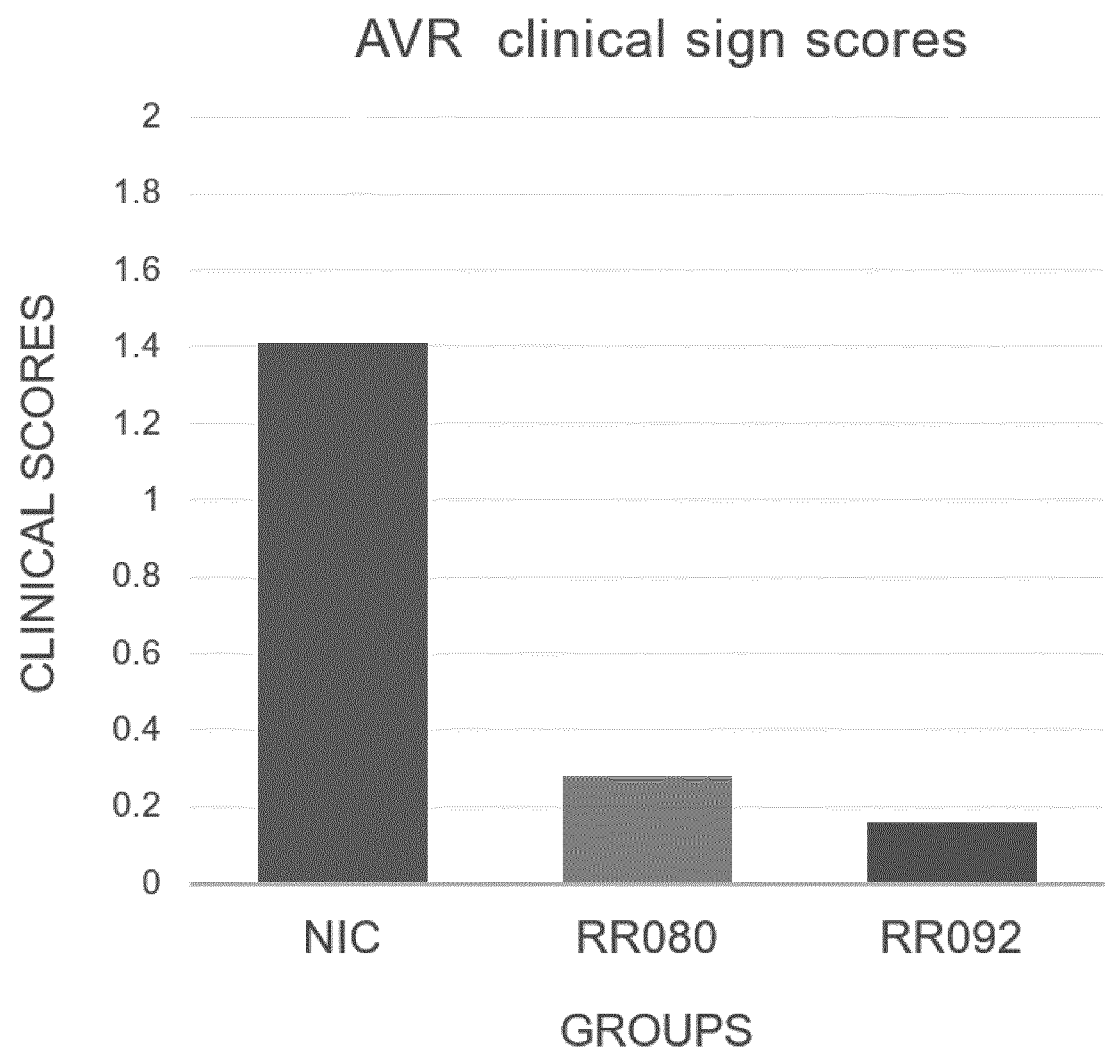

FIG. 6 illustrates the average of clinical sign scores in SPF chickens vaccinated with recombinant MDV1/ILT RR080 or RR092.

DETAILED DESCRIPTION OF THE INVENTION

The present invention generally relates to rMDV1 which comprise a recombinant nucleotide sequence located in MDV086.6 (SORF1) locus. The present invention also relates to compositions, such as vaccines, comprising such rMDV1, as well as to the use thereof for vaccination of animals, particularly poultry.

The present disclosure will be best understood by reference to the following definitions:

Definitions

The term "virus" designates in particular a viral particle comprising a nucleic acid molecule (e.g., a genome) encapsulated in a capsid or capsule. The term "virus" also designates a viral vector or an isolated viral genome.

The term "recombinant", in relation to a herpes virus, designates a herpes virus the genome of which has been modified by insertion of at least one nucleic acid, i.e., a nucleic acid (e.g., DNA, such as a gene) which is not found naturally in the genome of the herpes virus, or which is found naturally in said genome but in a different form or at a different position. A recombinant virus can be manufactured by a variety of methods such as recombinant DNA technology as described therein and, once made, can be reproduced without further use of recombinant DNA technologies, as also described herein.

In the present description, the terms "nucleic acid", "nucleic sequence," and "nucleotide sequence" are used interchangeably and refer to a nucleic acid molecule having a determined sequence, which may be deoxyribonucleotides and/or ribonucleotides. The nucleotide sequence may be first prepared by e.g., recombinant, enzymatic and/or chemical techniques, and subsequently replicated in a host cell or an in vitro system. A nucleotide sequence preferentially comprises an open reading frame encoding a molecule (e.g. a peptide or protein). The nucleotide sequence may contain additional sequences such as a promoter, a transcription terminator, a signal peptide, an IRES, etc. Preferably, an open reading frame in a recombinant nucleic acid does not contain an intron.

A "recombinant nucleotide sequence" designates a sequence which is not found naturally in the genome of a herpes virus, or which is found naturally in said genome but in a different form or at a different position. Typical "recombinant nucleotide sequences" are genes preferably encoding molecules which are not produced naturally by an avian herpes virus, such as molecules from a different virus or from a cell. A "gene" in the context of such "recombinant nucleotide sequence" designates any nucleic acid molecule containing an open reading frame, such as a nucleic acid consisting or consisting essentially of an open reading frame. The gene may further contain regulatory elements, such as a promoter or terminator, for instance.

In the present description, the terms "polypeptide", "peptide," and "protein" are used interchangeably and refer to any molecule comprising a polymer of at least 2 consecutive amino acids.

Within the context of the invention, the term "locus" designates, for a given gene, the entire region of the genome containing the open reading frame, the regulatory sequences, and the flanking intergenic sequences. In that respect, the MDV086.6 (SORF1) locus thus encompasses the SORF1 open reading frame, SORF1promoter/terminator sequences, as well as the intergenic sequences extending 5' and 3' thereof, i.e., between SORF1 and MDV086.4 on the one hand, and between SORF1 and MDV087 on the other hand.

The term "avian species" is intended to encompass all kinds of avians such as birds of the class of Aves, i.e., vertebrate animals which are feathered, winged, bipedal, endothermic and egg-laying. In the context of the invention, avians or avian species refer more particularly to birds with economical and/or agronomical interests, such as poultry, (such as chickens and turkeys), waterfowl poultry (such as ducks and geese) and ornamental birds (such as swans and psittacines).

The term "vaccine" as used herein designates an agent which may be used to cause, stimulate or amplify an immune response in an organism.

A "molecule or product of interest" includes, without limitation, a polypeptide (e.g., a peptide, a protein, etc.) as well as an RNA (e.g., an antisense RNA, an interfering RNA, an aptamer, etc.).

An "immune response" designates the development in a host of a cellular and/or antibody-mediated immune response to a composition or vaccine of interest. Usually, an "immune response" includes the production of antibodies, B cells, helper T cells, and/or cytotoxic T cells, directed specifically to an antigen or antigens included in the composition or vaccine of interest. Preferably, the immune response is protective such that resistance to new infection will be enhanced and/or the clinical severity of the disease reduced.

rMDV1

The invention generally relates to rMDV1 which comprise a recombinant nucleotide sequence (such as a foreign gene) located in MDV086.6 (SORF1) locus and the uses thereof Marek's Disease Viruses ("MDV") are avian herpes viruses. MDV are disclosed in publications (see for instance Kingham et al. "The genome of herpesvirus of turkeys: comparative analysis with Marek's disease viruses"—Journal of General Virology (2001) 82, 1123-1135) and generally available from collections. The sequence of the genome of MDV is also available in gene libraries (GenBank Acc. No. DQ530348 and AF291866).

The invention utilizes MDV of serotype 1, preferably non-pathogenic strains of MDV1 for the targeted animal. A particular example of such strain is the CVI988 Rispens strain (GenBank Acc. No. DQ530348).

The genome of MDV1 contains about 160 kbp organized into two distinct regions, L and S, that are composed of unique long (UL) and unique short (US) sequences bounded by inverted repeats. The genome contains nearly 400 reported open reading frames.

The invention stems from the finding that a specific locus in the MDV1 genome, located in US region, can be used to effectively and stably clone any foreign gene of interest. More specifically, the inventors have demonstrated that the MDV086.6 (also known as SORF1) locus represents a suitable new cloning site in MDV1 genome. MDV086.6 is located in the US region, on the terminus of Us region flanked by IRs region. This gene is unique to MDV, and it encodes a protein which consists of 76 amino acids in the case of the CVI988 Rispens strain (Brunovskis et al., 1993, PMID:7831788, hypothetical amino acid sequence of this protein: GenBank Acc. No. ABF72352.1) The function of said protein is currently unknown.

By conducting experiments, the inventors have verified that the lack of MDV086.6 (SORF1) hardly affects viral growth. The inventors have also demonstrated that viruses can be produced wherein a foreign gene is inserted at said locus, and that such recombinant constructs can be propagated, remain infectious in vivo, and can stably express the foreign gene.

The invention thus provides novel rMDV1 containing a recombinant nucleic acid (such as a foreign gene) located in the MDV086.6 (SORF1) locus.

Cloning at the MDV086.6 locus can be made by insertion within the coding gene sequence of the locus, insertion into an intergenic region of the locus, or by replacement of all or part of the sequence of the gene locus. The term "intergenic region" is well known in the art and refers to any region of a viral genome which is located between two specified viral ORFs. The intergenic region may thus include regulatory sequences.

The intergenic region may thus include regulatory sequences By reference to the genome of the CVI988 Rispens strain of MDV1, the coding sequence of MDV086.4 is located between nucleotides 154371 and 154529, the coding sequence of MDV086.6 (SORF1) is located between nucleotide 154605 and 154835, and the coding sequence of MDV087 (SORF2) is located between nucleotides 155025 and 155564. The intergenic region between MDV086.4 and MDV086.6 is thus located between nucleotides 154529 and 154605, and the intergenic region between MDV086.6 and MDV087 is thus located between nucleotides 154835 and 155025. Thus, according to the present invention, cloning at the MDV086.6 (SORF1) locus includes cloning anywhere between nucleotide 154529 and 155025 of a MDV1 genome, by reference to the CVI988 Rispens strain.

In the present application, reference to the complete genome of the CVI998 Rispens strain is a reference to said genome as described in Genbank under accession number DQ530348 at the filing date of the present application.

In a particular embodiment, the recombinant nucleic acid replaces all or part of the sequence of the gene locus. In a particular embodiment, the recombinant nucleic acid replaces all or part of SORF1 coding sequence and/or all or part of SORF1 regulatory sequence. Typically, the recombinant nucleic acid may replace from 30-100% of the sequence of the locus, such as from 30-100% of the ORF and/or regulatory portion of the locus. In a particular aspect of this embodiment, the replaced portion of the locus has a length similar to that of the recombinant nucleic acid. In another particular aspect of this embodiment, the replaced portion of the locus comprises at least 90% of the ORF. In another particular and preferred aspect of this embodiment, the recombinant nucleic acid replaces all of the coding sequence of the locus. This corresponds to nucleotides 154605 to 154835 of the genome of a MDV1, by reference to the CVI988 Rispens strain.

In another particular embodiment, the recombinant nucleic acid is inserted into an intergenic region flanking the SORF1 coding sequence, 5' or 3' thereof. In this regard, a preferred intergenic region is the intergenic region between MDV086.6 (SORF1) coding sequence and MDV087 (SORF2) coding sequence. Such region is located between SORF1 start codon and SORF2 start codon (since both coding sequences are in opposite orientation). Thus, this embodiment includes cloning anywhere between nucleotides positions 154835 and 155025 of the MDV1 genome, by reference to the CVI988 Rispens strain. An illustrative position for such cloning is between nucleotides 154835 and 154836. Such cloning strategy essentially does not lead to a deletion of viral sequence in the target gene locus, except occasionally between e.g., 1-5 nucleotides for cloning purpose.

Preferred rMDV1s of the invention contain a recombinant nucleic acid in the MDV086.6 (SORF1) locus and retain the coding sequence of at least one flanking gene, such as for instance SORF2. In particular, vectors of the invention do not contain genomic deletions spanning several viral genes in the cloning region, thus allowing stability/replicability efficiency. Particular rMDV1s of the invention thus contain a recombinant nucleic acid in the MDV086.6 (SORF1) locus and retain the coding sequence of SORF2 and/or US1.

Recombinant Nucleic Acid(s)

The nucleic acid(s) contained in rMDV1 of the invention may encode any product of interest, such as any protein, peptide or polypeptide, e.g., biologically active polypeptides, immunogenic (i.e., antigenic) polypeptides, etc.

In a preferred embodiment, the product of interest is an antigen, such as an antigenic protein, polypeptide or peptide, even more preferably a protein, peptide or polypeptide derived from an antigen of a pathogenic organism capable of causing an infection in an animal, particularly an avian. Examples of pathogens that cause infection in avian include viruses, bacteria, fungi, protozoa, etc. The immunogenic polypeptide may preferably be (derived from) a surface protein, a secreted protein, or a structural protein of said pathogen, or fragments thereof. The polypeptide can be derived from any source, e.g., viral, prokaryotic, eukaryotic or synthetic.

In a preferred embodiment, the nucleic acid encodes an antigen of a bird pathogenic agent.

Specific examples of bird pathogenic agents include, without limitation, avian influenza virus, avian paramyxovirus type 1, also called Newcastle disease virus (NDV), avian metapneumovirus, Marek's disease virus, Gumboro disease virus, also called infectious bursal disease virus (IBDV), Infectious laryngotracheitis virus (ILTV), Infectious bronchitis virus (IBV), *Escherichia coli, Salmonella species, Pasteurella multocida, Riemerella anatipestifer, Ornithobacterium rhinotracheale, Mycoplasma gallisepticum, Mycoplasma synoviae*, Mycoplasmas microorganisms infecting avian species or coccidian.

Preferentially, the antigen is selected from the F protein of NDV, the VP2 protein of IBDV, the gB protein of ILTV, the 40K protein of *Mycoplasma galisepticum*, and the surface protein hemagglutinin (HA) of the avian influenza virus, or immunogenic fragments thereof.

Within the context of the invention, the term "fragment" of a protein designates preferably a fragment comprising at least 5 consecutive amino acid residues of said protein, even more preferably from 5-100. In a preferred embodiment, such a fragment comprises at least one epitope and/or is immunogenic in vivo, i.e., can cause production of antibodies that bind the full length protein.

Specific examples of immunogenic peptides include, for instance, a peptide comprising amino acid residues 1-453 of VP2.

The recombinant nucleic acid may contain a promoter to drive expression of a product of interest. The promoter may be any promoter suitable for expression in e.g., avian cells, such as a cell promoter, a viral promoter, a synthetic/artificial promoter, etc., which may be regulated or not. In a particular embodiment, the promoter is selected from a chicken beta-actin (Bac) promoter or a derivative thereof such as Coa5; a Pec promoter; a Murine Cytomegalovirus (Mcmv) immediate-early (ie)1 promoter; a Human Cytomegalovirus promoter (Hcmv); a Simian virus (SV)40 promoter; and a Rous Sarcoma virus (RSV) promoter, or any fragments thereof which retain a promoter activity.

In a particular embodiment, the promoter is a chicken Beta actin promoter or a promoter derived therefrom, such as a Coa5 promoter.

The sequence of chicken Beta actin promoter has been reported in the art and is available on public gene libraries. An illustrative sequence is represented in SEQ ID NO: 22.

A promoter "derived" from a chicken beta actin promoter is a promoter that comprises a sequence of a functional fragment of a chicken beta actin promoter, preferably a sequence of a transcriptionally active fragment of a chicken beta actin promoter. The promoter may further comprise additional residues or functional domains, which may be artificial and/or obtained from distinct promoter(s). A promoter derived from a chicken beta actin promoter typically comprises at least 50 consecutive nucleotides of the sequence of said chicken beta actin promoter, or a sequence having at least 90% sequence identity thereto, preferably at least 96, 97, 98 or 99% sequence identity thereto, and exhibits transcriptional activity either alone or when combined with a further domain.

The chicken beta actin-derived promoter sequence for use in the present invention is more preferably a sequence that comprises at least a core sequence of a chicken beta actin promoter. The core sequence is typically located within the region between nucleotides −1200 to −900 of the native promoter, even more preferably between nt −1192 and −922. A specific example of a core sequence of a chicken beta actin promoter is presented in SEQ ID NO: 20.

In a particular embodiment, the promoter used in the invention contains a core sequence of a chicken beta-actin promoter which comprises (i) SEQ ID NO: 20 or (ii) a sequence having at least 90% sequence identity to SEQ ID NO: 20, preferably at least 96, 97, 98 or 99% sequence identity to SEQ ID NO: 20, and exhibiting transcriptional promoter activity.

In a particular embodiment, the promoter is a Coa5 promoter.

In another particular embodiment, the promoter is a RSV promoter.

rMDV1 Virus Construction

Gene cloning and plasmid construction are well known to one person of ordinary skill in the art and may be essentially performed by standard molecular biology techniques (Molecular Cloning: A Laboratory Manual. 4th Edition, Cold Spring Harbor Laboratory, Cold Spring Harbor, New York, USA, 2012).

Typically, the recombinant viruses may be prepared by homologous recombination between the viral genome and a construct (e.g., a plasmid) comprising the nucleic acid to be inserted, flanked by nucleotides from the insertion site to allow recombination. Insertion can be made with or without deletion of endogenous sequences.

For that purpose, a sequence containing the targeted MDV086.6 (SORF1) locus is typically first cloned into a suitable vector. Examples of vectors include plasmids, such as pBR322, pBR325, pBR327, pBR328, pUC18, pUC19, pUC7, pUC8, or pUC9; phages such as lambda phage and M13 phage; or cosmids such as pHC79.

The target region sequence is integrated into the vector according to a conventional cloning method. The target region sequence used is preferably of sufficient length so as to allow subsequent in vivo homologous recombination with the viral genome. Preferably, the cloned target region sequence shall have at least approximately 100 nucleotides in length, typically above 300, such as between 1000 and 2000 nucleotides.

The coding and promoter sequences, for insertion into the virus, are inserted into the target region of the viral genome cloned in the vector. Insertion shall be made preferably in a manner that leaves a portion of sequence of the target region on each side of the cloned insert of a length sufficient to allow homologous recombination (e.g. of at least 50 nucleotides, preferably of at least 100 nucleotides). The coding and promoter sequences can be introduced into the cloned target region by classical restriction enzyme and ligation procedures. If appropriate, mutation(s) may be carried out at a specific site of the target region to create a new cleavage site for a restriction enzyme. Conventional mutagenesis techniques well known by a person skilled in the art may be used for that purpose, such as e.g., in vitro mutagenesis or PCR.

Vectors in which the coding and promoter sequence has been inserted into the target region obtained as above may be introduced into an MDV1-infected cell or MDV1 genome-transfected cells using known techniques such as electroporation, calcium phosphate, lipofectin-based method, or the like. The recombinant viruses are thereby produced by recombination in said cells between the homologous regions of MDV1-DNA and the vector. When the amount of the vector is in the range of 0.1 to 1000 μg, the efficiency of generation of recombinant viruses is particularly optimized.

The resulting recombinant virus may be selected genotypically or phenotypically using known techniques of selection, e.g., by hybridization, detecting enzyme activity encoded by a gene integrated along with the recombinant nucleic acid sequences or detecting the antigenic peptide expressed by the recombinant virus immunologically. The selected recombinant virus can be cultured on a large scale in cell culture after which, recombinant virus containing peptides can be collected.

Preferred rMDV1s

Preferred rMDVs of the invention encode an antigenic peptide selected from the F protein of NDV, the VP2 protein of IBDV, the gB protein of ILTV, the 40K protein of *Mycoplasma galisepticum*, and the surface protein HA of the avian influenza virus, or immunogenic fragments thereof.

A preferred rMDV1 of the invention comprises a recombinant nucleic acid encoding a VP2 antigen of IBDV or a gB antigen of ILTV in replacement of all or part of MDV086.6 (SORF1) coding and/or regulatory regions of the genome.

Another preferred rMDV1 of the invention comprises a recombinant nucleic acid encoding a VP2 antigen of IBDV or a gB antigen of ILTV located within MDV086.6 (SORF1) coding region of the genome, essentially without deletion of said coding region.

Another preferred rMDV1 of the invention comprises a recombinant nucleic acid encoding a VP2 antigen of IBDV or a gB antigen of ILTV located in the intergenic region between MDV086.6 (SORF1) and MDV087 (SORF2).

Another preferred rMDV1 of the invention comprises, inserted in MDV086.6 (SORF1) gene coding sequence, a recombinant nucleotide sequence encoding a VP2 protein of IBDV, or an immunogenic fragment thereof, under the control of a Coa5 promoter.

Another preferred rMDV1 of the invention comprises at least one recombinant nucleic acid replacing all or part of MDV086.6 (SORF1) gene locus. Preferably, the avian antigen is a VP2, or gB protein or an immunogenic fragment thereof, under the control of a Coa5 promoter or the control of a Rous Sarcoma virus (RSV) promoter.

Another preferred rMDV1s of the invention comprise at least one recombinant nucleic acid inserted into the intergenic region between MDV086.6 (SORF1) and MDV087 (SORF2).

Preferably, the avian antigen is a VP2, or gB protein or an immunogenic fragment thereof, under the control of Coa5 promoter.

Specific and preferred examples of such rMDV1s of the invention include RR071, RR072, RR075, RR080, RR083, RR092, RR093, and RR094.

In RR071, a nucleotide sequence encoding the VP2 protein of IBDV of SEQ ID NO:19 is located under the control of Coa5 promoter of SEQ ID NO:20, linked to SV40 poly adenylation signal of SEQ ID NO:21 at the 3'-terminus, inserted in the coding sequence of MDV086.6 (SORF1) of MDV1 with positive (plus) direction (strand).

In RR072, a nucleotide sequence encoding the VP2 protein of IBDV of SEQ ID NO:19 is located under the control of Coa5 promoter of SEQ ID NO:20, linked to SV40 poly adenylation signal of SEQ ID NO:21 at the 3'-terminus, and replaces the coding sequence of MDV086.6 (SORF1) of MDV1 with negative (minus) direction.

In RR075, a nucleotide sequence encoding the VP2 protein of IBDV of SEQ ID NO:19 is located under the control of Coa5 promoter of SEQ ID NO:20, linked to SV40 poly adenylation signal of SEQ ID NO:21 at the 3'-terminus, and is inserted in the intergenic region between MDV086.6 (SORF1) and MDV087 (SORF2) of MDV1 with positive direction.

In RR080, a nucleotide sequence encoding the gB protein of ILTV of SEQ ID NO: 23 is located under the control of Coa5 promoter of SEQ ID NO: 20, and replaces the coding sequence of MDV086.6 (SORF1) of MDV1 with positive direction.

In RR083, a nucleotide sequence encoding the gB protein of ILTV of SEQ ID NO: 23 is located under the control of RSV promoter of SEQ ID NO: 24, and replaces the coding sequence of MDV086.6 (SORF1) of MDV1 with negative direction.

In RR092, a nucleotide sequence encoding the gB protein of ILTV of SEQ ID NO:23 is located under the control of Coa5 promoter of SEQ ID NO:20, and is inserted in the coding sequence of MDV086.6 (SORF1) of MDV1 with negative direction.

In RR093, a nucleotide sequence encoding the gB protein of ILTV of SEQ ID NO:23 is located under the control of Coa5 promoter of SEQ ID NO:20, and is inserted in the coding sequence of MDV086.6 (SORF1) of MDV1 with positive direction.

In RR094, a nucleotide sequence encoding the gB protein of ILTV of SEQ ID NO:23 is located under the control of Coa5 promoter of SEQ ID NO:20, and is inserted in the intergenic region between MDV086.6 (SORF1) and MDV087 (SORF2) of MDV1 with positive direction.

Cell Cultures

The recombinant viruses of the present invention may be propagated in any competent cell cultures. After required growth of the viruses is achieved, the cells may be detached from the wells using a scraper or with trypsin and the infected cells may be separated from the supernatant by centrifugation.

Examples of competent cells include CEF, embryonated egg, chicken kidney cell, and the like. The cells or viruses may be cultured in a culture medium such as Eagle's MEM, Leibowitz-L-15/McCoy 5A (1:1 mixture) culture medium at about 37° C. for 3 to 6 days. The infected cells are typically suspended in a culture medium containing 10% dimethyl sulfoxide (DMSO) or CELLBANKER© 1 (ZENOAQ) and stored frozen under liquid nitrogen or in a deep freezer at e.g., −85° C.

Compositions and Vaccines

The invention also relates to compositions, such as vaccines, which comprise one or more recombinant MDV1 of the invention, and a pharmaceutically or veterinary acceptable excipient and/or adjuvant.

Suitable excipients and adjuvants are known to the skilled person.

The rMDVs of the invention may be used in live form (e.g., to prepare live vaccines) or, alternatively, in inactivated, attenuated, or killed form. The production of such forms is known in the art.

Preferably, the composition of the invention is a vaccine.

The composition or vaccine according to the present invention may further comprise a suitable solvent, such as for example an aqueous buffer or a phosphate buffer. Preferably, the composition or vaccine also comprises additives. Additives of the present invention may be obtained from any of a number of sources including various proteins and peptides derived from animals (e.g., hormones, cytokines, co-stimulatory factors), and novel nucleic acids derived from viruses and other sources (e.g., double stranded RNA, CpG), and the like which are administered with the composition or vaccine. In addition, any number of combinations of the aforementioned substances may provide an immunopotentiation effect.

The compositions or vaccines of the present invention may further be formulated with one or more further additives to maintain isotonicity, physiological pH and stability, for example, a buffer such as physiological saline (0.85%), phosphate-buffered saline (PBS), citrate buffers, Tris(hydroxymethyl aminomethane (TRIS), Tris-buffered saline and the like, or an antibiotic, for example, neomycin or streptomycin, etc.

The route of administration can be any route including oral, ocular (e.g., by eyedrop), oculo-nasal administration using aerosol, intranasal, Cloacal in feed, in water, or by spray, in ovo, topically, or by injection (e.g., intravenous, subcutaneous, intramuscular, intraorbital, intraocular, intradermal, and/or intraperitoneal) vaccination. The skilled person will easily adapt the formulation of the vaccine composition for each type of route of administration.

Each vaccine dose may contain a suitable dose sufficient to elicit a protective immune response in avian species. Optimization of such dose is well known in the art. The amount of antigen per dose may be determined by known methods using antigen/anti-body reactions, for example by the ELISA method.

The compositions or vaccines of the invention can be administered as single doses or in repeated doses, depending on the vaccination protocol.

The compositions or vaccines of the present invention are further advantageous in that they confer to bird species protection against the targeted avian pathogens, as shown in Example 6.

Uses

The present invention further relates to a rMDV1 or a composition (vaccine) of the invention for use for vaccinating an avian, such as poultry, against a pathogen.

Such vaccination is preferably performed by administering an immunologically effective amount of a rMDV1 or composition (vaccine) according to the invention.

The rMDV1 or composition (vaccine) of the invention may be advantageously administered intradermally, subcutaneously, intramuscularly, orally, in ovo, by mucosal administration or via oculo-nasal administration, preferably subcutaneously.

The rMDV1 or composition (vaccine) of the invention can conveniently be used in combination with a further recombinant herpes virus of a distinct serotype and expressing a distinct antigen, for vaccinating an avian, preferably a chicken, by simultaneous, separate sequential or alternated administration.

The present invention further relates to vaccination kits for immunizing avian species which comprises an effective amount of the composition or vaccine as described above and means for administering said composition or vaccine to said species. For example, such kit comprises an injection device filled with the vaccine according to the invention and instructions for intradermic, subcutaneous, intramuscular, or in ovo injection. Alternatively, the kit comprises a spray/aerosol or eye drop device filled with the vaccine according to the invention and instructions for oculo-nasal administration, oral or mucosal administration.

Further aspects and advantages of the invention will be disclosed in the following experimental section, which is illustrative of the claimed invention.

Examples

Figure 2:
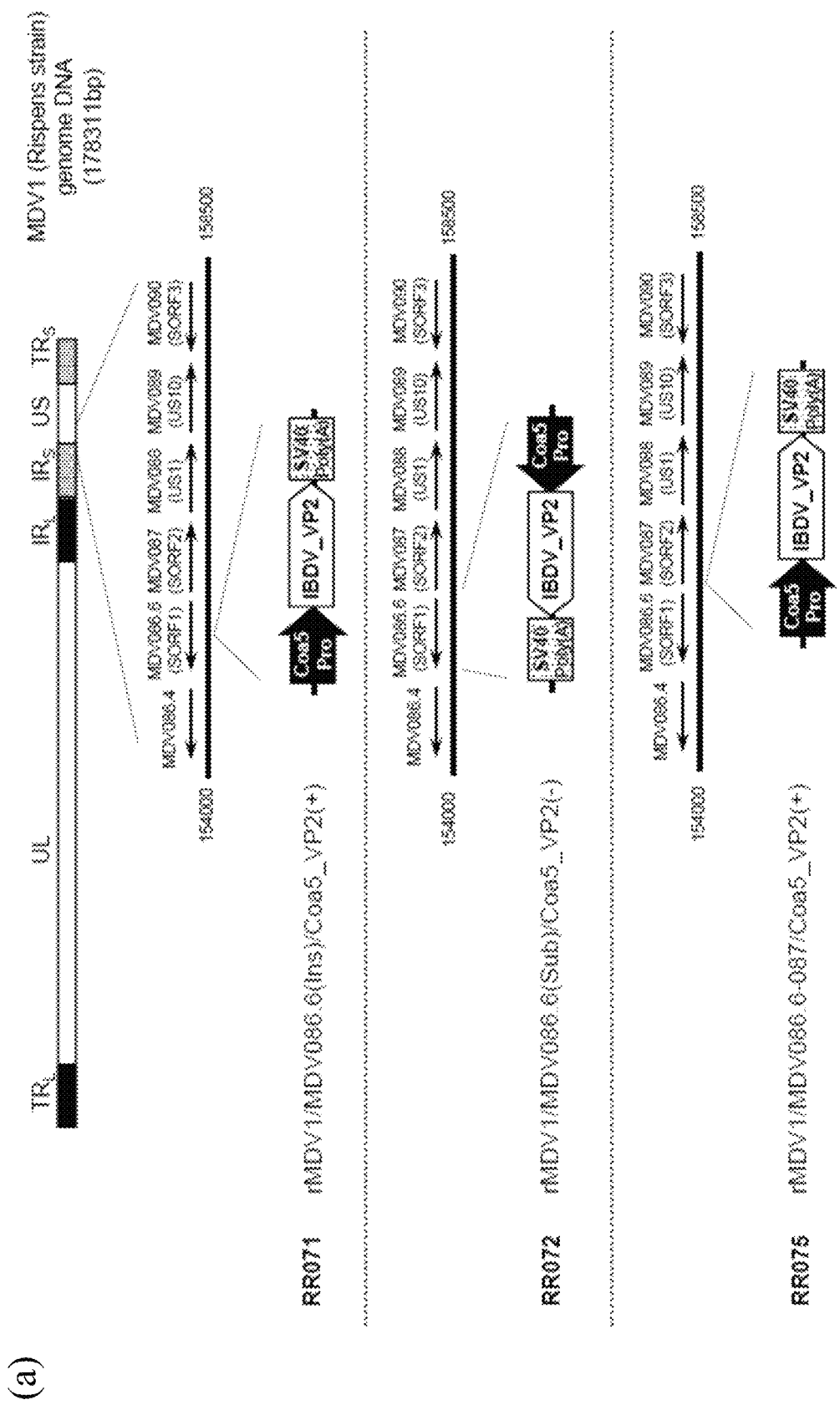
FIG. 2 shows diagrams of (a) recombinant MDV1/IBDs genome (RR071, RR072, RR075) and (b) recombinant MDV1/ILTs genome (RR080, RR083, RR092, RR093, RR094).

The inventors constructed a series of recombinant MDV1 with different expression cassettes inserted in MDV086.6 locus. Schematic diagrams of them are shown in FIG. 2(a) and FIG. 2(b).

These viruses are designated as follows (virus/insertion site/inserted genes(direction)):

RR071: rMDV1/MDV086.6(Ins)/Coa5_VP2(+)
RR072: rMDV1/MDV086.6(Sub)/Coa5_VP2(−)
RR075: rMDV1/MDV086.6-087/Coa5_VP2(+)
RR080: rMDV1/MDV086.6(Sub)/Coa5_gBdel(+)
RR083: rMDV1/MDV086.6(Sub)/RSV_gBdel(−)
RR092: rMDV1/MDV086.6(Ins)/Coa5_gBdel(−)
RR093: rMDV1/MDV086.6(Ins)/Coa5_gBdel(+)
RR094: rMDV1/MDV086.6(Ins)/Coa5_gBdel(−)

Example 1: Construction of Homology Vectors

The plasmid construction was essentially performed by the standard molecular biology techniques (Molecular Cloning: A Laboratory Manual. 4th Edition, Cold Spring Harbor Laboratory, Cold Spring Harbor, New York, USA, 2012).

Construction of pUC18_MDV086.6(Ins)_SfiI

Figure 1:
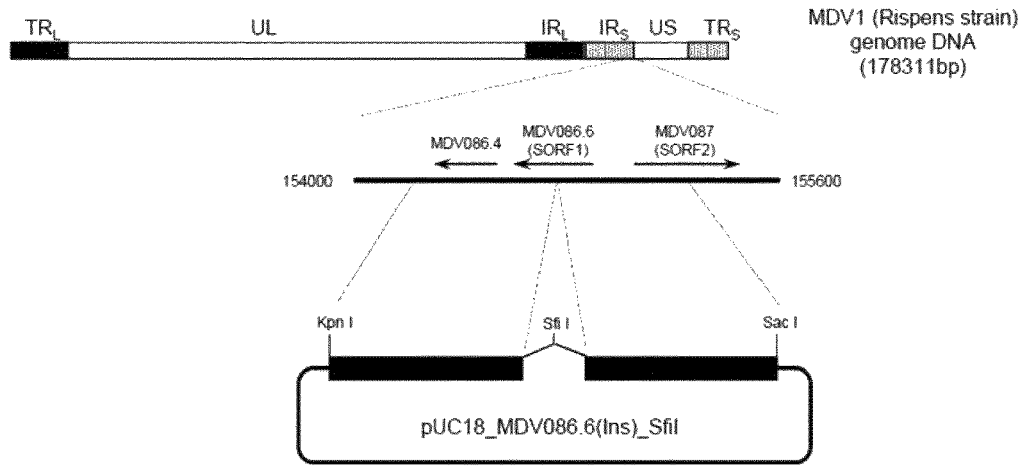
FIG. 1 illustrates three types of basal homology plasmids which can be used to construct (a) RR071, or (b) RR072, or (c) RR075 respectively.
Figure 1:
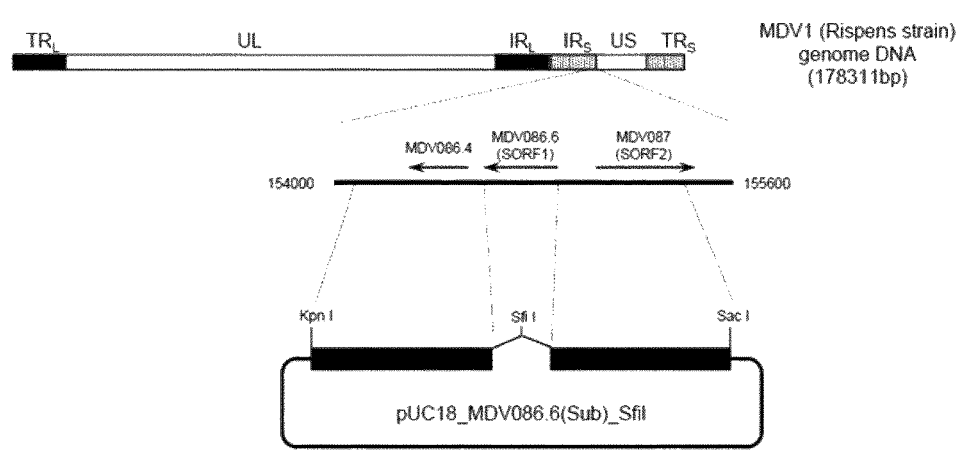
Figure 1:
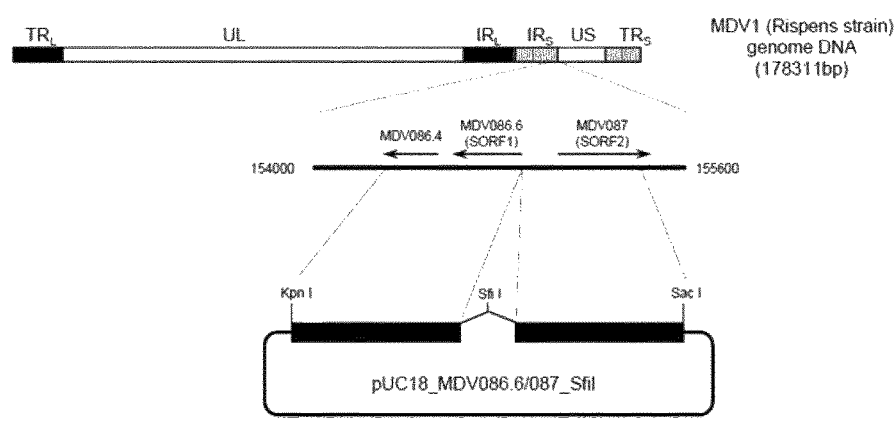

A 1.1-kb DNA fragment of MDV1 Rispens strain genome flanking the target locus, MDV086.6 (SORF1) gene, was cloned by PCR so that SfiI recognition site was added in the middle of MDV086.6 (SORF1) (FIG. 1(a)). Briefly, using DNA extracted from MDV1 Rispens strain (PASS+21) as a template, two steps of PCR were conducted. Primer pairs used in the 1st PCR are SEQ ID NO:1 and SEQ ID NO:3, SEQ ID NO:2 and SEQ ID NO:4. The 2nd PCR was conducted using a mixture of PCR products derived from the 1st PCR as a template and SEQ ID NO:1 and SEQ ID NO:4 as primers. As obtained PCR fragment was cloned into pUC18 vector (GenBank Acc. No. L09136) after digestion with KpnI and Sac I, resulting in pUC18_MDV086.6(Ins)_SfiI. This basal homology plasmid is depicted in FIG. 1(a).

Construction of pUC18_MDV086.6(Sub)_SfiI

A 1.1-kb DNA fragment of MDV1 Rispens strain genome flanking the target locus, MDV086.6 (SORF1) gene, was cloned by PCR so that MDV086.6 (SORF1) was replaced with SfiI recognition site (FIG. 1(b)). Briefly, using DNA extracted from MDV1 Rispens strain (PASS+21) as a template, two steps of PCR were conducted. Primer pairs used in the 1st PCR are SEQ ID NO:5 and SEQ ID NO:7, SEQ ID NO:6 and SEQ ID NO:8. The 2nd PCR was conducted using a mixture of PCR products derived from the 1st PCR as a template and SEQ ID NO:5 and SEQ ID NO:8 as primers. As obtained PCR fragment was cloned into pUC18 vector (GenBank Acc. No. L09136) after digestion with KpnI and Sac I, resulting in pUC18_MDV086.6(Sub)_SfiI. This basal homology plasmid is depicted in FIG. 1(b).

Construction of pUC18_MDV086.6/087_SfiI

A 1.3-kb DNA fragment of MDV1 Rispens strain genome flanking the target locus, the intergenic region between MDV086.6 (SORF1) and MDV087 (SORF2), was cloned by PCR so that SfiI recognition site was added between MDV086.6 (SORF1) and MDV087 (SORF2) (FIG. 1(c)). Briefly, using DNA extracted from MDV1 Rispens strain (PASS+21) as a template, two steps of PCR were conducted. Primer pairs used in the 1st PCR are SEQ ID NO:5 and SEQ ID NO:10, SEQ ID NO:9 and SEQ ID NO:8. The 2nd PCR was conducted using a mixture of PCR products derived from the 1st PCR as a template and SEQ ID NO:5 and SEQ ID NO:8 as primers. As obtained PCR fragment was cloned into pUC18 vector (GenBank Acc. No. L09136) after digestion with KpnI and Sac I, resulting in pUC18_MDV086.6/087_SfiI. This basal homology plasmid is depicted in FIG. 1(c).

Construction of pUC18_MDV086.6(Sub)_Coa5VP2(−)

Utilizing the plasmid pUC18_MDV086.6(Sub)_SfiI, this homology vector containing the Coa5 promoter and IBDV VP2 gene from standard challenge strain (VP2-STC) was constructed. This homology vector was used to construct recombinant MDV1/IBD, RR072. First, pUC18_MDV086.6(Sub)_SfiI was cleaved with SfiI and dephosphorylated with Alkaline Phosphatase Shewanella sp. S1B1 Recombinant (PAP) (Funakoshi #DE110). The "Coa5 promoter IBDV VP2 SV40 polyA signal" gene cassette was obtained by SfiI-BglI digestion of pUC18-MDV071-Coa5VP2stc (WO 2016120421 A1) and inserted into the SfiI-digested pUC18_MDV086.6(Sub)_SfiI, resulting in pUC18_MDV086.6(Sub)_Coa5VP2(−). This plasmid contains the "Coa5 promoter IBDV VP2 SV40 polyA signal" gene cassette at the negative direction.

Construction of pUC18_MDV086.6(Ins)_Coa5VP2(+)

As for construction of this homology vector, "Coa5 promoter IBDV VP2 SV40 polyA signal" gene cassette was amplified by PCR using pUC18_MDV086.6(Sub)_Coa5VP2(−) as a PCR template and SEQ ID NO:11 and SEQ ID NO:12 as primers. An obtained PCR fragment was digested with SfiI and inserted into pUC18_MDV086.6 (Ins)_ SfiI. The resultant plasmid, pUC18_MDV086.6(Ins)_Coa5VP2(+), was used to make RR071. This plasmid contains the "Coa5 promoter IBDV VP2 SV40 polyA signal" gene cassette at the positive direction.

Construction of pUC18_MDV086.6/087_Coa5VP2(+)

As for construction of this homology vector, "Coa5 promoter IBDV VP2 SV40 polyA signal" gene cassette was amplified by PCR using pUC18_MDV086.6(Sub)_Coa5VP2(−) as a PCR template and SEQ ID NO:11 and SEQ ID NO:12 as primers. An obtained PCR fragment was digested with SfiI and inserted into pUC18_MDV086.6/087_SfI. The resultant plasmid, pUC18_MDV086.6/087_Coa5VP2(+), was used to make RR075. This plasmid contains the Coa5 promoter-VP2-STC gene cassette at the positive direction.

Construction of pUC18_MDV086.6(Sub)_Coa5gBdel(+)

Utilizing the plasmid pUC18_MDV086.6(Sub)_SfiI, this homology vector was constructed and used to make RR080. First, pUC18_MDV086.6(Sub)_SfiI was cleaved with SfiI and dephosphorylated with PAP. The "Coa5 promoter_ILTV gBdel" gene cassette was constructed by PCR amplification and inserted into the SfiI-digested pUC18_MDV086.6 (Sub)_ SfiI, resulting in pUC18_MDV086.6(Sub) _Coa5gBdel(+). The nucleotide sequence of ILTV gBdel gene was originally obtained by subcloning from ILTV strain 632 (EP1731612A1). Here, this gene was modified slightly without amino acid alteration. The sequence of ILTV gBdel employed in this document is presented as SEQ ID NO; 23. This plasmid contains the "Coa5 promoter_ILTV gBdel" gene cassette at the positive direction.

Construction of pUC18_MDV086.6(Sub)_RSVgBdel(−)

Utilizing the plasmid pUC18_MDV086.6(Sub)_SfiI, this homology vector was constructed and used to make RR083. The "RSV promoter_ILTV gBdel" gene cassette was constructed by subcloning and inserted into the SfiI-digested pUC18_MDV086.6(Sub)_SfiI, resulting in pUC18_MDV086.6(Sub)_RSVgBdel(−). The nucleotide sequence of RSV promoter was subcloned by using pBK-RSV vector (Stratagene) as a PCR template. That sequence is presented as SEQ ID NO: 24. This plasmid contains the "RSV promoter_ILTV gBdef" gene cassette at the negative direction.

Construction of pUC18_MDV086.6(Ins)_Coa5gBdel(−)

Utilizing the plasmid pUC18_MDV086.6(Ins)_SfiI, this homology vector was constructed and used to make RR092. The "Coa5 promoter_ILTV gBdef" gene cassette was obtained by PCR amplification and inserted into the SfiI-digested pUC18_MDV086.6(Ins)_SfiI, resulting in pUC18_MDV086.6(Ins)_Coa5gBdel(−). This plasmid contains the "Coa5 promoter_ILTV gBdef" gene cassette at the negative direction.

Construction of pUC18_MDV086.6(Ins)_Coa5gBdel(+)

Utilizing the plasmid pUC18_MDV086.6(Ins)_SfiI, this homology vector was constructed and used to make RR093. The "Coa5 promoter_ILTV gBdef" gene cassette was obtained by PCR amplification and inserted into the SfiI-digested pUC18_MDV086.6(Ins)_SfiI, resulting in pUC18_MDV086.6(Ins)_Coa5gBdel(+). This plasmid contains the "Coa5 promoter_ILTV gBdef" gene cassette at the positive direction.

Construction of pUC18_MDV086.6/087_Coa5gBdel(−)

Utilizing the plasmid pUC18_MDV086.6/087_SfiI, this homology vector was constructed and used to make RR094. The "Coa5 promoter_ILTV gBdef" gene cassette was obtained by PCR amplification and inserted into the SfiI-digested pUC18_MDV086.6(Ins)_SfiI, resulting in pUC18_MDV086.6/087_Coa5gBdel(−). This plasmid contains the "Coa5 promoter_ILTV gBdef" gene cassette at the negative direction.

Example 2: Construction of Recombinant MDV1

Construction of recombinant MDV1 was conducted by homologous recombination in cultured cells. For homologous recombination in cultured cells, viral DNA of wild type MDV1 Rispens strain (PASS+22) was prepared as described by Morgan et al. (Avian Diseases, 34:345-351, 1990). Approximately 2 μg of the MDV1 Rispens strain DNA and 1 μg of one of the homology vector were transfected into approximately $10^7$ CEF cells by electroporation using Nucleofector II (Lonza, Basel, Switzerland). The transfected cells were added to Leibovitz's L-15 (Life Technologies Corp., Cat. #41300-39), McCoy's 5A Medium (Life Technologies Corp., Cat. #21500-061) (1:1) and 4% calf serum [LM (+) medium], planted in 96-well tissue culture plates, and then incubated at 37° C. in 4-5% $CO_2$ for 5-7 days until recombinant MDV1 plaques became visible. The cells were then detached from the plates by trypsinization, transferred equally to two 96-well plates with CEF, and incubated for 4 to 6 days until plaques were observed. Screening was conducted by the black plaque assay, staining only plaques expressing IBDV VP2 protein or ILTV gB protein. Briefly, one of the two plates was fixed with methanol:acetone mixture (1:2) and incubated with anti-IBDV VP2 mouse monoclonal antibody R63 (ATCC #: HB-9490) or anti-ILTV gB mouse monoclonal antibody #1_B4_7 (unpublished). Next, incubated with biotinylated anti-mouse IgG antibody (Vector Laboratories, Cat #BA-9200) and then with VEC-TASTAIN ABC-AP kit (Vector Laboratories, Cat #AK-5000), plaques expressing VP2 protein or gB protein were stained by addition of NBT/BCIP solution (Roche Applied Science, Cat #1681451). Wells containing stained recombinant plaques were identified and cells from the corresponding wells on the other 96-well plate were trypsinized. The cells were then diluted in fresh secondary CEF cells and transferred to 96-well plates to complete the first round of purification. The purification procedure was repeated until all plaques were stained positively in the black plaque assay.

Example 3: Verification of Genome Structure

With RR072 as a model case, characterization method of recombinant MDV1/IBD is described below. Briefly, genome structures of the recombinant MDV1/IBDs were verified by three PCR reactions amplifying junction regions at each end of the inserted genes. FIG. 3(a) shows where all the junctions which are located in RR072. The primer pairs used in the PCR reactions are SEQ ID NO:13 and SEQ ID NO:15 for Junction 1, and SEQ ID NO:14 and SEQ ID NO:16 for Junction 2, and SEQ ID NO:13 and SEQ ID NO:14 for Junction 3. FIG. 3(b) demonstrates that RR072 has the correct genome structure. Expected sizes of PCR products were observed with all other recombinant MDV1/IBDs, namely RR071 and RR075, confirming that these recombinant MDV1/IBD also have the expected genome structures.

Similarly, characterization of recombinant MDV1/ILT is described by the case of RR080 and RR083. Genome structures of the recombinant MDV1/ILTs were also verified by three PCR reactions amplifying junction regions at each end of the inserted genes. FIG. 4(a) shows where all Junctions located in RR080 and RR083. The primer pairs used in the PCR reactions are SEQ ID NO:13 and SEQ ID NO:17 for Junction 4, and SEQ ID NO:14 and SEQ ID NO:18 for Junction 5, and SEQ ID NO:13 and SEQ ID NO:14 for Junction 6, and SEQ ID NO:13 and SEQ ID NO:18 for Junction 7, and SEQ ID NO:14 and SEQ ID NO:17 for Junction 8. FIG. 4(b) shows that both RR080 and RR083 have the objective genome structure. Expected sizes of PCR products were observed with all other recombinant MDV1/ILTs, namely RR092 and RR093 and RR094, confirming that these recombinant MDV1/ILTs also have the expected genome structures.

Example 4: Expression of a VP2 Antigen by Recombinant MDV1

Expression of a VP2 antigen by the recombinant MDV1/IBD of the invention was confirmed by the Western blot assay. The western blot was conducted using CEF cells infected with the recombinant viruses and anti-IBDV rabbit serum. Briefly, CEF cells in 12-well plates were infected with one of the recombinant viruses or the other recombinant virus strain at a multiplicity of infection of approximately 0.01. Three days post inoculation, cells were harvested with trypsin and centrifuged at 913×g for 5 minutes. The pellet was washed with PBS and resuspended with 100 µl of PBS. After adding the same volume of 2×SDS sample buffer (130 mM Tris-Cl (pH6.8), 6% SDS, 20% Glycerol, 10% 2-Mercaptoethanol and 0.01% Bromo Phenol Blue), cell suspension was boiled for 5 minutes. The samples were separated by SDS-PAGE using 10% polyacrylamide gel and transferred to a PVDF membrane (Immobilon-P, Millipore). The membrane was dried completely and then incubated with anti-IBDV rabbit serum. After anti-IBDV rabbit serum was washed off, biotinylated anti-rabbit IgG antibody (Vector Laboratories, Cat #BA-9200) and then with VEC-TASTAIN ABC-AP kit (Vector Laboratories, Cat #AK-5000). Protein bound with the anti-IBDV rabbit serum was visualized by addition of NBT/BCIP solution (Roche Applied Science, Cat #1681451).

As shown in FIG. 3(c), protein bands of 40 kilodaltons (kDa), which was the expected size of the VP2 protein, were observed in the lanes with RR072 infected cells.

The other recombinant MDV1/IBDs, RR071 and RR075, were also confirmed that they express VP2 protein by Western blot analysis.

Example 5: Expression of a gB Antigen by Recombinant MDV1

The evaluation of gB protein expression from recombinant MDV1/ILT of the invention was performed essentially as described in Example 4, using RR080 and RR083. To detect ILTV gB protein, anti-ILTV gB mouse monoclonal antibody (#1_B4_7, unpublished clone) was employed as a $1^{st}$ antibody. Molecular weight of gB protein which is expressed from recombinant MDV1/ILT is estimated to be about 53 kDa.

As shown in FIG. 4(c), protein bands were detected at around 53 kDa in the lanes of RR080 or RR083.

Example 6: Efficacy of Recombinant MDV1/IBDs of the Invention in SPF Chickens

The efficacy of RR071, RR072 and RR075 was investigated in SPF chickens. Chickens at one day of age were divided into five groups and chicks in Groups 3, 4 and 5 were vaccinated subcutaneously with approximately 3000 plaque forming units (pfu)/0.2 ml of one of the recombinant MDV1 (RR071: Group 3, RR072: Group 4, RR075: Group 5). Chicks in Group 2 (non-immunized, challenged positive control) were left unvaccinated. Chicks in Group 1 (non-immunized, non-challenged control) were left unvaccinated and unchallenged. The chickens were bled each week between 1 and 5 weeks of age and tested for presence of anti-IBDV antibodies with a commercial IBDV ELISA kit (ID Screen® IBD VP2: IDvet). Challenge was conducted at 5 weeks of age. For challenge, $3\times10^3$ $EID_{50}$ of virulent IBDV STC strain was administered via oral route. Chickens were observed daily for clinical signs associated with IBD, such as depression and death. Seven days post challenge, chickens were necropsied and observed for grossly observable bursal lesions such as edema, discoloration, atrophy, hemorrhage, and yellow or gelatinous exudates. Weights of body and bursa were also measured at necropsy for calculation of B/B index, which is the ratio between the weight of the bursa and the body weight of challenged birds divided by the same ratio of non-challenged birds.

The results of IBDV ELISA are shown in FIG. 5.

Results of efficacy are provided in Table 1.

TABLE 1

Protection elicited by recombinant MDV1/IBDs of the invention against virulent IBDV challenge at 5 weeks of age in SPF chickens

| Group number | Group | # chickens | B/B Index | # dead after challenge | # with bursal lesions/# total | % protection |
|---|---|---|---|---|---|---|
| 1 | NINC | 15 | 1.00 | 0 | 0 | 100 |
| 2 | NIC | 15 | 0.53 | 10 | 5 | 0 |
| 3 | RR071 | 15 | 0.89 | 0 | 3 | 80 |
| 4 | RR072 | 14 | 0.96 | 0 | 2 | 86 |
| 5 | RR075 | 15 | 0.75 | 0 | 5 | 67 |

The results show that RR071, RR072 and RR075 elicited a protective immunity against IBDV challenge infection in vivo.

Example 7: Efficacy of Recombinant MDV1/ILTs of the Invention in SPF Chickens The efficacy of recombinant MDV1/ILTs (RR080, RR092) was investigated in SPF chickens. Chickens at one day of age were divided into three groups and chickens in Groups 2 and 3 were vaccinated subcutaneously with approximately 3000 plaque forming units (pfu) /0.2 ml of one of the recombinant MDV1/ILT (RR080: Group 2, RR092: Group 3). Chickens in Group 1 (non-immunized, challenged positive control) were left unvaccinated. The chickens were bled each week between 1 and 5 weeks of age. Challenge was conducted at 5 weeks of age. For challenge, $1 \times 10^3$ $EID_{50}$ of virulent ILTV US strain was administered via oral route. Chickens were observed daily for clinical signs associated with ILT, such as sneeze and gasping. The daily clinical sign scores were calculated by dividing "the total points of clinical signs at that day" by "the number of living chickens at that day". When calculating the points of clinical signs, death was counted as 6 points, and other clinical signs were counted as 1 point per 1 symptom. The average of clinical sign scores in chickens vaccinated with each recombinant MDV1/ILT are summarized in FIG. 6. Eleven days post challenge, chickens were necropsied and observed for grossly observable respiratory tract lesions such as bloody expectoration.

Results are provided in Table 2.

TABLE 2

Protection elicited by recombinant MDV1/ILTs of the invention against virulent ILTV challenge at 5 weeks of age in SPF chickens

| Group number | Group | # chickens | # challenged | # dead | # symptoms | % protection |
|---|---|---|---|---|---|---|
| 1 | NIC | 15 | 15 | 7 | 8 | 0 |
| 2 | RR080 | 15 | 15 | 3 | 2 | 66.7 |
| 3 | RR092 | 15 | 15 | 3 | 1 | 73.3 |

The results show that recombinant MDV1/ILTs RR080 and RR092 of the invention elicited protective immunity against ILTV challenge infection in vivo.

What is claimed is:

1. A recombinant Marek's Disease Virus of serotype 1 (rMDV1) comprising a recombinant nucleotide sequence in its genome, wherein said recombinant nucleotide sequence is located in the MDV086.6 (SORF1) locus of the genome, and wherein said rMDV1 retains the coding sequence of SORF2 and US1.

2. The rMDV1 of claim 1, wherein the recombinant nucleotide sequence replaces all or part of the MDV086.6 locus.

3. The rMDV1 of claim 1, wherein the recombinant nucleotide sequence is located within MDV086.6 coding region, essentially without deletion of SORF1 locus sequence.

4. The rMDV1 of claim 1, wherein the recombinant nucleotide sequence is located into the intergenic region between MDV086.4 and MDV086.6, or into the intergenic region between MDV086.6 and MDV087 (SORF2).

5. The rMDV1 of claim 1, wherein the rMDV1 is the CVI988 Rispens strain of MDV1.

6. The rMDV1 of claim 1, wherein said recombinant nucleotide sequence encodes an antigen of an avian pathogen.

7. The rMDV1 of claim 6, wherein said avian pathogen is selected from Newcastle disease virus (NDV), Gumboro disease virus, Infectious bursal disease virus (IBDV), infectious laryngotracheitis virus (ILTV), infectious bronchitis virus (IBV), mycoplasma (MG), or coccidia.

8. The rMDV1 of claim 7, wherein the recombinant nucleotide sequence encodes a VP2 protein of IBDV, a gB protein of ILTV, or immunogenic fragments thereof.

9. The rMDV1 of claim 1, wherein the recombinant nucleotide sequence contains a transcriptional promoter.

10. The rMDV1 of claim 9, wherein the promoter is selected from a chicken beta-actin (Bac) promoter or a derivative thereof; a Pec promoter; a Murine Cytomegalovirus (Mcmv) immediate-early (ie)1 promoter; a Human Cytomegalovirus promoter (Hcmv); a Simian virus (SV)40 promoter; and a Rous Sarcoma virus (RSV) promoter, or any fragments thereof which retain a promoter activity.

11. The rMDV1 of claim 1, wherein said rMDV1 comprises a recombinant nucleotide sequence encoding a VP2 protein of IBDV or a gB protein of ILTV, or immunogenic fragments thereof, in replacement of all or part of the MDV086.6 locus of the genome.

12. The rMDV1 of claim 1, wherein said rMDV1 comprises a recombinant nucleotide sequence encoding a VP2 protein of IBDV or a gB protein of ILTV, or immunogenic fragments thereof, located within MDV086.6 coding region of the genome, essentially without deletion of said locus.

13. The rMDV1 of claim 1, wherein said rMDV1 comprises a recombinant nucleotide sequence encoding a VP2 protein of IBDV or a gB protein of ILTV located in the intergenic region between MDV086.6 and MDV087.

14. A nucleic acid molecule comprising the genome of the rMDV1 of claim 1.

15. A vector comprising the nucleic acid molecule of claim 14.

16. A host cell comprising a rMDV1 of claim 1.

17. A method for producing or replicating a rMDV1 of claim 1, comprising infecting a competent cell with a nucleic acid molecule comprising the genome of a rMDV1 comprising a recombinant nucleotide sequence in its genome, wherein said recombinant nucleotide sequence is located in the MDV086.6 (SORF1) locus of the genome or with the rMDV1, and collecting the rMDV1.

18. The composition comprising a rMDV1 of claim 1 and a pharmaceutically or veterinary acceptable excipient and/or adjuvant.

19. A method for vaccinating an avian against a pathogen comprising administering the rMDV1 of claim 1 to an avian.

20. A method for vaccinating an avian against at least two distinct pathogens comprising administering the rMDV1 of claim 1 in combination with a further recombinant herpes virus of a distinct serotype and expressing a distinct antigen to an avian, by simultaneous, separate, sequential or alternated administration.

21. A vaccination kit for vaccinating an avian, which comprises the following components:
   a. an effective amount of the composition of claim 18, and
   b. means for administering said composition to said avian.

22. A host cell comprising the nucleic acid of claim 14.

23. A method for vaccinating an avian against a pathogen comprising administering the composition of claim 18 to an avian.

24. A method for vaccinating an avian against at least two distinct pathogens comprising administering the composition of claim 18 in combination with a further recombinant herpes virus of a distinct serotype and expressing a distinct antigen to an avian.

25. The rMDV1 of claim 9, wherein the promoter is a Coa5 promoter.

* * * * *